United States Patent
Kanemaru et al.

(10) Patent No.: US 8,984,556 B2
(45) Date of Patent: Mar. 17, 2015

(54) RECEIVER APPARATUS AND REPRODUCING APPARATUS

(75) Inventors: Takashi Kanemaru, Yokohama (JP); Hidenori Sakaniwa, Yokohama (JP); Toshiyuki Nemoto, Fujisawa (JP)

(73) Assignee: Hitachi Maxell, Ltd., Osaka (JP)

( * ) Notice: Subject to any disclaimer, the term of this patent is extended or adjusted under 35 U.S.C. 154(b) by 178 days.

(21) Appl. No.: 12/778,765

(22) Filed: May 12, 2010

(65) Prior Publication Data

US 2011/0078737 A1 Mar. 31, 2011

(30) Foreign Application Priority Data

Sep. 30, 2009 (JP) ................................. 2009-225867

(51) Int. Cl.
*G06F 3/00* (2006.01)
*H04N 13/00* (2006.01)
*H04N 13/04* (2006.01)

(52) U.S. Cl.
CPC ....... *H04N 13/0059* (2013.01); *H04N 13/0488* (2013.01); *H04N 13/007* (2013.01); *H04N 13/0454* (2013.01); *H04N 13/0456* (2013.01)
USPC .................... 725/40; 725/43; 725/44; 725/47

(58) Field of Classification Search
None
See application file for complete search history.

(56) References Cited

U.S. PATENT DOCUMENTS

| 6,331,852 B1 * | 12/2001 | Gould et al. .................. 345/419 |
| 6,754,906 B1 * | 6/2004 | Finseth et al. .................. 725/45 |
| 2003/0084445 A1 * | 5/2003 | Pilat .............................. 725/44 |
| 2003/0084447 A1 | 5/2003 | Lee |
| 2005/0166236 A1 * | 7/2005 | Nishina et al. ................. 725/47 |
| 2006/0269226 A1 | 11/2006 | Ito et al. |
| 2006/0282855 A1 * | 12/2006 | Margulis ......................... 725/43 |
| 2009/0165048 A1 * | 6/2009 | Nishimura ....................... 725/39 |

(Continued)

FOREIGN PATENT DOCUMENTS

| CN | 1416266 A | 5/2003 |
| CN | 1799267 A | 7/2006 |
| CN | 1893653 A | 1/2007 |

(Continued)

OTHER PUBLICATIONS

Chinese Office Action issued in Chinese Application No. 201010198663.0 dated Jan. 24, 2014.

(Continued)

*Primary Examiner* — Cai Chen
(74) *Attorney, Agent, or Firm* — McDermott Will & Emery LLP

(57) ABSTRACT

For executing a graphic display without generating the sense of incompatibility in a view, within a receiver apparatus enabling 3D display, and also for an improvement of usability thereof, a receiver apparatus or a reproducing apparatus for obtaining digital information including information of whether a cubic display can be made or not, together with video information, comprises a controller portion for producing graphic data for use of display added with a parallax thereto, wherein the graphic data without generating a sense of incompatibility to a user by changing all or a part of the graphic data for use of display into data for use of cubic display, when producing the data fitting to a condition of a cubic display of an output video. In particular, when producing data of electronic program table, the cubic display is executed, partially, fitting to an object, and thereby increasing usability for a user.

14 Claims, 27 Drawing Sheets

(56) References Cited

U.S. PATENT DOCUMENTS

2010/0098326 A1* 4/2010 Abeloe .................. 382/154
2012/0002006 A1 1/2012 Kim et al.

FOREIGN PATENT DOCUMENTS

JP 2001-169197 6/2001
JP 2004-274125 A 9/2004

OTHER PUBLICATIONS

Chinese Office Action with English translation issued in Chinese Application No. 201010198663.0 mailed on Oct. 10, 2012.
Office Action Japanese Patent Application No. JP 2013-237517 dated Sep. 2, 2014.

* cited by examiner

FIG. 4

| | 011 | 021 | 031 | 041 | 051 | 061 |
|---|---|---|---|---|---|---|
| | | | | | | |
| 17 | JOURNEY AIMLESSLY STOPPING OVER | DRAMA ENCORE THEATER | 30 YATTA MAN | NEWS NNN | NEWS WIDE | FOREST OF NEWS |
| 18 | NEWS 6 | ANIMATION MAJOR RANNTARO | TODAY'S NEWS OF KANAGAWA NEWS | | | |
| 19 | MOVIE "CENTER OF EARTH 3D" | EDUCATION SITE | WILD KINGDOM | QUEUING MATRIMONIAL CENTER | QUIZ, COMMONSENSE OF JAPAN! | SATURDAY VARIETY SURPRISE |
| | | CHINESE LECTURE | VEGETABLE PARADISE | VARIETY 8 | STRAY DETECTIVE | EXPLOSIVE FAUGH! LAUGHING THEATER |
| | | KOREAN LECTURE | | | | |
| | NEWS 9 | SPANISH LECTURE | TODAY'S AFFAIRS | MOVIE "BOY OF 19TH CENTURY" | TALKING SWORDFISH PALACE | SONG PROGRAM |

402 — 7/25 (SAT) 19:00–21:00 / 011ch / MOVIE "CENTER OF EARTH 3D"

401

403 — RED: 3D DISPLAY  BLUE: SEARCH  YELLOW: NEXT DAY  GREEN: PREVIOUS DAY

7/25 (SAT) 19:00 – 21:00
011ch
MOVIE "CENTER OF EARTH 3D"

| | 011 | 021 | 031 | 041 | 051 | 061 |
|---|---|---|---|---|---|---|
| 17 | JOURNEY AIMLESSLY STOPPING OVER | DRAMA ENCORE THEATER | FUNCTION MENU | NEWS NNN | NEWS WIDE | FOREST OF NEWS |
| 18 | NEWS 6 | ANIMAT MAJOR RANNTA | 3D DISPLAY ON | | | |
| 19 | MOVIE "CENTER OF EARTH 3D" | EDUCAT SITE | 3D DISPLAY OF RECOMMENDED PROGRAM | | UIZ, OMMONSENSE OF JAPAN! | SATURDAY VARIETY SURPRISE |
| | | CHINES LECTUR | 1 CHANNEL DISPLAY<br>ENLARGE PROGRAM TABLE<br>REDUCE PROGRAM TABLE | | TRAY ETECTIVE | EXPLOSIVE FAUGH! LAUGHING THEATER |
| 20 | | KOREAN LECTURE | | | | |
| 21 | NEWS 9 | SPANISH LECTURE | TODAY'S AFFAIRS | MOVIE "BOY OF 19TH CENTURY" | TALKING SWORDFISH PALACE | SONG PROGRAM |

RED: DETAILED EXPLANATION   BLUE: SEARCH   YELLOW: NEXT DAY   GREEN: PREVIOUS DAY

7/25 (SAT) 19:00 – 21:00
011ch
MOVIE "CENTER OF EARTH 3D"

| | 011 | 021 | 031 | 041 | 051 | 061 |
|---|---|---|---|---|---|---|
| 17 | JOURNEY AIMLESSLY STOPPING OVER | DRAMA ENCORE THEATER | FUNCTION MENU | | S WIDE | FOREST OF NEWS |
| 18 | NEWS 6 | ANIMAT MAJOR RANNTA | 3D DISPLAY OFF | | | |
| 19 | MOVIE "CENTER OF EARTH 3D" | EDUCAT SITE | 3D DISPLAY OF RECOMMENDED PROGRAM | | MONSENSE JAPAN! | SATURDAY VARIETY SURPRISE |
| | | CHINES LECTUR | 1 CHANNEL DISPLAY | | AY ETECTIVE | EXPLOSIVE LAUGH! LAUGHING THEATER |
| 2 | | KOREAN LECTURE | ENLARGE PROGRAM TABLE | | | |
| 2 | NEWS 9 | SPANISH LECTURE | REDUCE PROGRAM TABLE | TODAY'S AFFAIRS | MOVIE "BOY OF 19TH CENTURY" | TALKING SWORDFISH PALACE | SONG PROGRAM |

RED: DETAILED EXPLANATION   BLUE: SEARCH   YELLOW: NEXT DAY   GREEN: PREVIOUS DAY

| | | 011 | 021 | 031 | 041 | 051 | 061 |
|---|---|---|---|---|---|---|---|
| 17 | | JOURNEY AIMLESSLY STOPPING OVER | DRAMA ENCORE THEATER | | | | FOREST OF NEWS |
| | | | | 30 YATTA MAN | NEWS NNN | NEWS WIDE | |
| 18 | | NEWS 6 | ANIMATION MAJOR | TODAY'S NEWS OF KANAGAWA NEWS | | | |
| | | | RANNTARO | | | | |
| 19 | | MOVIE "CENTER OF EARTH 3D" | EDUCATION SITE | WILD KINGDOM | QUEUING MATRIMONIAL CENTER | QUIZ, COMMONSENSE OF JAPAN! | SATURDAY VARIETY SURPRISE |
| 20 | | | CHINESE LECTURE | VEGETABLE PARADISE | VARIETY 8 | STRAY DETECTIVE | EXPLOSIVE FAUGH! LAUGHING THEATER (801) |
| | | | KOREAN LECTURE | | | | |
| 21 | | NEWS 9 | SPANISH LECTURE | TODAY'S AFFAIRS | MOVIE "BOY OF 19TH CENTURY" | TALKING SWORDFISH PALACE | SONG PROGRAM |

7/25 (SAT) 20:00–21:00
061ch
EXPLOSIVE FAUGH! LAUGHING THEATER

RED: PROGRAM TABLE RECOMMENDED   BLUE: SEARCH   YELLOW: NEXT DAY   GREEN: PREVIOUS DAY

FIG. 11A

7/25 (SAT) 19:00 – 21:00
011ch
MOVIE "CENTER OF EARTH 3D"

| | 011 | 021 | 031 | 041 | 051 | | 3D PROGRAM |
|---|---|---|---|---|---|---|---|
| 17 | JOURNEY AIMLESSLY STOPPING OVER | DRAMA ENCORE THEATER | | | | | |
| 18 | NEWS 6 | ANIMATION MAJOR RANNTARO | 30 YATTA MAN TODAY'S NEWS OF KANAGAWA NEWS | NEWS NNN | NEWS WIDE | | 091 JUMP UP NEWS |
| 19 | MOVIE "CENTER OF EARTH 3D" | EDUCATION SITE | WILD KINGDOM | QUEUING MATRIMONIAL CENTER | | | 011 MOVIE "CENTER OF EARTH 3D" |
| 20 | | CHINESE LECTURE KOREAN LECTURE | VEGETABLE PARADISE | VARIETY 8 | QUIZ, COMMONSENSE OF JAPAN! | | |
| 21 | NEWS 9 | SPANISH LECTURE | TODAY'S AFFAIRS | MOVIE "BOY OF 19TH CENTURY" | STRAY DETECTIVE TALKING SWORDFISH PALACE | | |

RED: 3D PROGRAM DISPLAY EXCHANGE   BLUE: SEARCH   YELLOW: NEXT DAY   GREEN: PREVIOUS DAY 51, 1101

FIG. 11B

7/25 (SAT) 19:00–21:00
011ch
MOVIE "CENTER OF EARTH 3D"

| | 011 | 021 | 031 | 041 | 051 | | 3D PROGRAM |
|---|---|---|---|---|---|---|---|
| 17 | JOURNEY AIMLESSLY STOPPING OVER | DRAMA ENCORE THEATER | | | | | |
| 18 | NEWS 6 | ANIMATION MAJOR RANNNTARO | 30 YATTA MAN TODAY'S NEWS OF KANAGAWA NEWS | NEWS NNN | NEWS WIDE | | |
| 19 | MOVIE "CENTER OF EARTH 3D" | EDUCATION SITE | WILD KINGDOM | QUEUING MATRIMONIAL CENTER | | 091 JUMP UP NEWS | |
| 20 | | CHINESE LECTURE KOREAN LECTURE | VEGETABLE PARADISE | VARIETY 8 | QUIZ, COMMONSENSE OF JAPAN! | 011 MOVIE "CENTER OF EARTH 3D" | |
| | | | | | STRAY DETECTIVE | | |
| 21 | NEWS 9 | SPANISH LECTURE | TODAY'S AFFAIRS | MOVIE "BOY OF 19TH CENTURY" | TALKING SWORDFISH PALACE | | |

RED: 3D PROGRAM DISPLAY EXCHANGE   BLUE: SEARCH   YELLOW: NEXT DAY   GREEN: PREVIOUS DAY 51
1102

FIG. 11C

7/25 (SAT) 19:00 – 21:00
011ch
MOVIE "CENTER OF EARTH 3D"

| | 011 | 021 | 031 | 041 | 051 | 3D PROGRAM |
|---|---|---|---|---|---|---|
| 17 | JOURNEY AIMLESSLY STOPPING OVER | DRAMA ENCORE THEATER | | | | |
| 18 | NEWS 6 | ANIMATION MAJOR RANNTARO | 30 YATTA MAN | NEWS NNN | NEWS WIDE | 111 3D MUSEUM — 1103 |
| 19 | MOVIE "CENTER OF EARTH 3D" | EDUCATION SITE | TODAY'S NEWS OF KANAGAWA NEWS | | | 011 MOVIE "CENTER OF EARTH 3D" |
| 20 | | CHINESE LECTURE / KOREAN LECTURE | WILD KINGDOM / VEGETABLE PARADISE | QUEUING MATRIMONIAL CENTER / VARIETY 8 | QUIZ, COMMONSENSE OF JAPAN! / STRAY DETECTIVE | |
| 21 | NEWS 9 | SPANISH LECTURE | TODAY'S AFFAIRS | MOVIE "BOY OF 19TH CENTURY" | TALKING SWORDFISH PALACE | |

RED: 3D PROGRAM DISPLAY EXCHANGE   BLUE: SEARCH   YELLOW: NEXT DAY   GREEN: PREVIOUS DAY

7/25 (SAT) 19:00 – 21:00
011ch
MOVIE "CENTER OF EARTH 3D"

| | 011 | 021 | 031 | 041 | 051 | 3D PROGRAM |
|---|---|---|---|---|---|---|
| 17 | JOURNEY AIMLESSLY STOPPING OVER | DRAMA ENCORE THEATER | | NEWS NNN | NEWS WIDE | |
| 18 | NEWS 6 | ANIMATION MAJOR / RANNTARO | 30 YATTA MAN / TODAY'S NEWS OF KANAGAWA NEWS | | | 091 JUMP UP NEWS / 111 3D MUSEUM |
| 19 | MOVIE "CENTER OF EARTH 3D" | EDUCATION SITE | WILD KINGDOM | QUEUING MATRIMONIAL CENTER | QUIZ, COMMONSENSE OF JAPAN! | 011 MOVIE "CENTER OF EARTH 3D" |
| 20 | | CHINESE LECTURE / KOREAN LECTURE | VEGETABLE PARADISE | VARIETY 8 | STRAY DETECTIVE | |
| 21 | NEWS 9 | SPANISH LECTURE | TODAY'S AFFAIRS | MOVIE "BOY OF 19TH CENTURY" | TALKING SWORDFISH PALACE | |

RED: 3D PROGRAM DISPLAY EXCHANGE   BLUE: SEARCH   YELLOW: NEXT DAY   GREEN: PREVIOUS DAY

| 7/25 (SAT) 18:00 – 19:00 |
|---|
| 091ch |
| JUMP UP NEWS |

| | 011 | 021 | 031 | 041 | 051 | 3D PROGRAM |
|---|---|---|---|---|---|---|
| 17 | JOURNEY AIMLESSLY STOPPING OVER | DRAMA ENCORE THEATER | | NEWS NNN | NEWS WIDE | |
| 18 | NEWS 6 | ANIMATION MAJOR RANNTARO | 30 YATTA MAN TODAY'S NEWS OF KANAGAWA NEWS | | | 091 JUMP UP NEWS 111 3D |
| 19 | MOVIE "CENTER OF EARTH 3D" | EDUCATION SITE | WILD KINGDOM | QUEUING MATRIMONIAL CENTER | QUIZ, COMMONSENSE OF JAPAN! | MOVIE "CENTER OF EARTH 3D" |
| 20 | | CHINESE LECTURE KOREAN LECTURE | VEGETABLE PARADISE | VARIETY 8 | STRAY DETECTIVE | |
| 21 | NEWS 9 | SPANISH LECTURE | TODAY'S AFFAIRS | MOVIE "BOY OF 19TH CENTURY" | TALKING SWORDFISH PALACE | |

RED: 3D PROGRAM DISPLAY EXCHANGE   BLUE: SEARCH   YELLOW: NEXT DAY   GREEN: PREVIOUS DAY

| 7/25 (SAT) 18:00 – 19:00 111ch 3D MUSEUM | | | | | | |
|---|---|---|---|---|---|---|
| | 011 | 021 | 031 | 041 | 051 | 3D PROGRAM |
| 17 | JOURNEY AIMLESSLY STOPPING OVER | DRAMA ENCORE THEATER | 30 YATTA MAN | NEWS NNN | NEWS WIDE | |
| 18 | NEWS 6 | ANIMATION MAJOR RANNTARO | TODAY'S NEWS OF KANAGAWA NEWS | | | |
| 19 | MOVIE "CENTER OF EARTH 3D" | EDUCATION SITE | WILD KINGDOM | QUEUING MATRIMONIAL CENTER | QUIZ, COMMONSENSE OF JAPAN! | 091 JUMP UP 111 3D MUSEUM OTT MOVIE "CENTER OF EARTH 3D" |
| 20 | | CHINESE LECTURE KOREAN LECTURE | VEGETABLE PARADISE | VARIETY 8 | STRAY DETECTIVE | |
| 21 | NEWS 9 | SPANISH LECTURE | TODAY'S AFFAIRS | MOVIE "BOY OF 19TH CENTURY" | TALKING SWORDFISH PALACE | |

RED: 3D PROGRAM DISPLAY EXCHANGE   BLUE: SEARCH   YELLOW: NEXT DAY   GREEN: PREVIOUS DAY

51

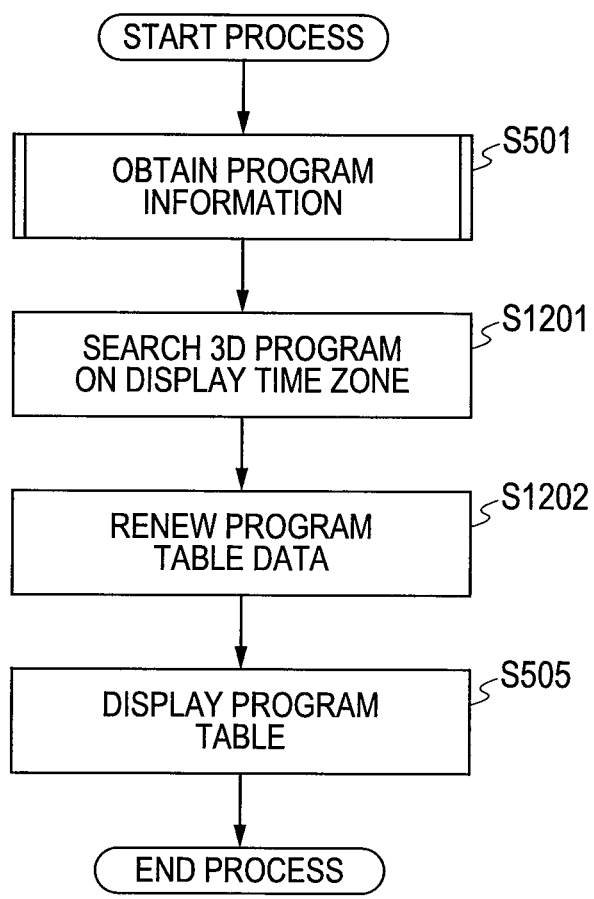

FIG. 13A

| | 011 | 021 | 031 | 041 | 051 | 061 |
|---|---|---|---|---|---|---|
| | | | | | | |

7/25 (SAT) 20:00 – 21:00
061ch
EXPLOSIVE FAUGH! LAUGHING THEATER

| | 011 | 021 | 031 | 041 | 051 | 061 |
|---|---|---|---|---|---|---|
| 17 | JOURNEY AIMLESSLY STOPPING OVER | DRAMA ENCORE THEATER | | NEWS NNN | NEWS WIDE | FOREST OF NEWS |
| 18 | NEWS 6 | ANIMATION MAJOR RANNTARO | 30 YATTA MAN | | | |
| | | | TODAY'S NEWS OF KANAGAWA NEWS | | | |
| 19 | MOVIE "CENTER OF EARTH 3D" | EDUCATION SITE | WILD KINGDOM | QUEUING MATRIMONIAL CENTER | QUIZ, COMMONSENSE OF JAPAN! | SATURDAY VARIETY SURPRISE |
| 20 | | CHINESE LECTURE | VEGETABLE PARADISE | VARIETY 8 | STRAY DETECTIVE | EXPLOSIVE FAUGH! LAUGHING THEATER |
| | | KOREAN LECTURE | | | | |
| 21 | NEWS 9 | SPANISH LECTURE | TODAY'S AFFAIRS | MOVIE "BOY OF 19TH CENTURY" | TALKING SWORDFISH PALACE | SONG PROGRAM |

RED: ENLARGE DISPLAY    BLUE: SEARCH    YELLOW: NEXT DAY    GREEN: PREVIOUS DAY

7/25 (SAT) 20:00-21:00
061ch
EXPLOSIVE FAUGH! LAUGHING THEATER

| | 041 | 051 | 061 |
|---|---|---|---|
| 19 | 00 QUEUING MATRIMONIAL CENTER<br>CONTENTS: 0000<br>CAST: XXXX | 00 QUIZ, COMMONSENSE OF JAPAN!<br>CONTENTS: 0000<br>CAST: XXXX | 00 SATURDAY VARIETY SURPRISE<br>CONTENTS: 0000<br>CAST: XXXX |
| 20 | 56 VARIETY 8<br>CONTENTS: 0000<br>CAST: XXXX | 00 STRAY DETECTIVE STORY, Δ<sup>TH</sup> TIME / TOTAL ∇ TIMES<br>TITLE: 0000<br>CONTENTS: 0000<br>CAST: XXXX | 00 EXPLOSIVE FAUGH! LAUGHING THEATER<br>CONTENTS: 0000<br>CAST: XXXX |
| 21 | 00 MOVIE "BOY OF 19<sup>TH</sup> CENTURY"<br>CONTENTS: 0000 | 00 TALKING SWORDFISH PALACE<br>CONTENTS: 0000 | 00 SONG PROGRAM<br>CONTENTS: 0000 |

51

RED: REDUCE DISPLAY    BLUE: SEARCH    YELLOW: NEXT DAY    GREEN: PREVIOUS DAY

FIG. 14A

| | 7/20 | 7/21 | 7/22 | 7/23 | 7/24 | 7/25 |
|---|---|---|---|---|---|---|
| | 7/25 (SAT) 20:00 – 21:00 061ch EXPLOSIVE FAUGH! LAUGHING THEATER | | | | | |
| 17 | FOREST OF NEWS | FOREST OF NEWS | FOREST OF NEWS | FOREST OF NEWS | FOREST OF NEWS | FOREST OF NEWS |
| 18 | | | | | | |
| 19 | MONDAY VARIETY FRIEND PARK 2 | PERIOD DRAMA HOUR MITO-KOHMON 50TH PART | WEDNESDAY VARIETY NEFU LEAGUE | NIGHT GAME KYOJIN V. HANNSHINN 20TH GAME IN TOKYO DOME | NIGHT GAME KYOJIN V. HANNSHINN 21TH GAME IN TOKYO DOME | SATURDAY VARIETY SURPRISE |
| 20 | WORLD TV SPECIAL INVESTIGATION | QUIZ COMMON SENSE POWER | 3D VIDEO SPECIAL PROGRAM | | | EXPLOSIVE FAUGH! LAUGHING THEATER |
| 21 | MONTH 9 DRAMA | PITTANKO KANKAN | WEDNESDAY THEATER "3D HARRY ... | THURSDAY DRAMA | WEEKLY BROADCAST | SONG PROGRAM |

RED: ENLARGE DISPLAY   BLUE: SEARCH   YELLOW: NEXT DAY   GREEN: PREVIOUS DAY

| 7/25 (SAT) 20:00 – 21:00 061ch |||||||
|---|---|---|---|---|---|---|
| EXPLOSIVE FAUGH! LAUGHING THEATER |||||||
| | 7/20 | 7/21 | 7/22 | 7/23 | 7/24 | 7/25 |
| 17 | FOREST OF NEWS | FOREST OF NEWS | FOREST OF NEWS | FOREST OF NEWS | FOREST OF NEWS | FOREST OF NEWS |
| 18 | | | | | | |
| 19 | MONDAY VARIETY FRIEND PARK 2 | PERIOD DRAMA HOUR MITO-KOHMON 50TH PART | WEDNESDAY VARIETY NEFU LEAGUE | NIGHT GAME KYOJIN V. HANNSHINN 20TH GAME IN TOKYO DOME | NIGHT GAME KYOJIN V. HANNSHINN 21TH GAME IN TOKYO DOME | SATURDAY VARIETY SURPRISE |
| 20 | WORLD TV SPECIAL INVESTIGATION | QUIZ COMMON SENSE POWER | 3D VIDEO SPECIAL PROGRAM | | | EXPLOSIVE FAUGH! LAUGHING THEATER |
| 21 | MONTH 9 DRAMA | PITTANKO KANKAN | WEDNESDAY THEATER "3D HARRY ... | THURSDAY DRAMA | WEEKLY BROADCAST | SONG PROGRAM |

RED: ENLARGE DISPLAY   BLUE: SEARCH   YELLOW: NEXT DAY   GREEN: PREVIOUS DAY

| MOVIE | DRAMA | SPORTS | ANIMATION | FAVORITE |

| PROGRAM TITLE | BROADCAST TIME | ch |
|---|---|---|
| CENTER OF EARTH 3D | 7/25 (SAT) 19:00 | 011 |
| BOY OF 19TH CENTURY | 7/25 (SAT) 21:00 | 041 |
| PRETTY MAN | 7/25 (SAT) 21:00 | 091 |
| BATMAN FORE… | 7/25 (SAT) 23:00 | 091 |
| GRUDGE SPELL | 7/25 (SAT) 25:00 | 091 |
| MONSTER INC. 3D | 7/26 (SUN) 15:00 | 051 |
| SKY OF SHOWSHANK | 7/26 (SUN) 19:00 | 091 |
| HAICHI | 7/26 (SUN) 21:00 | 061 |

RED: RESERVATION   BLUE: RE-ARRANGE   YELLOW: NEXT PAGE   GREEN: PREVIOUS PAGE

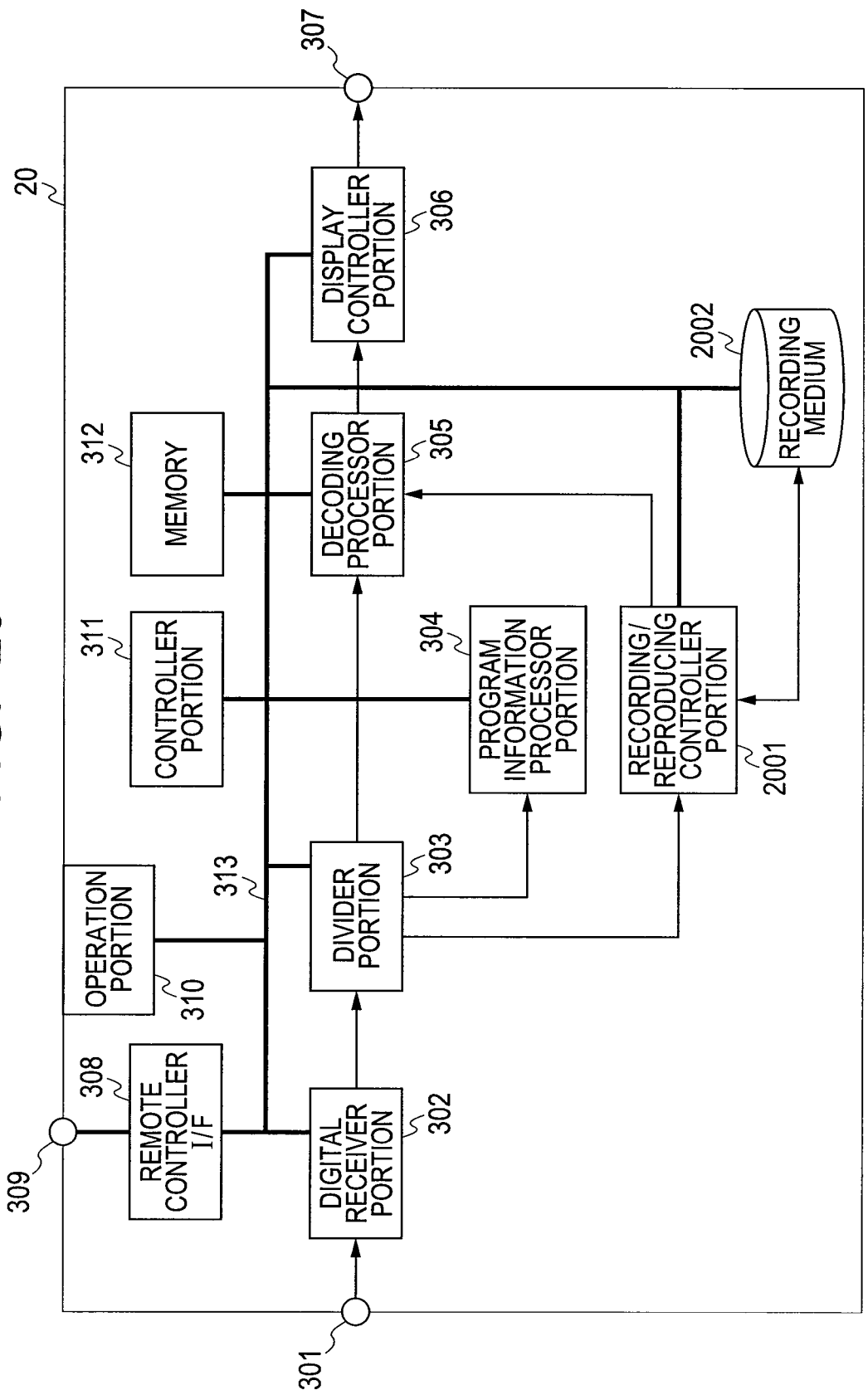

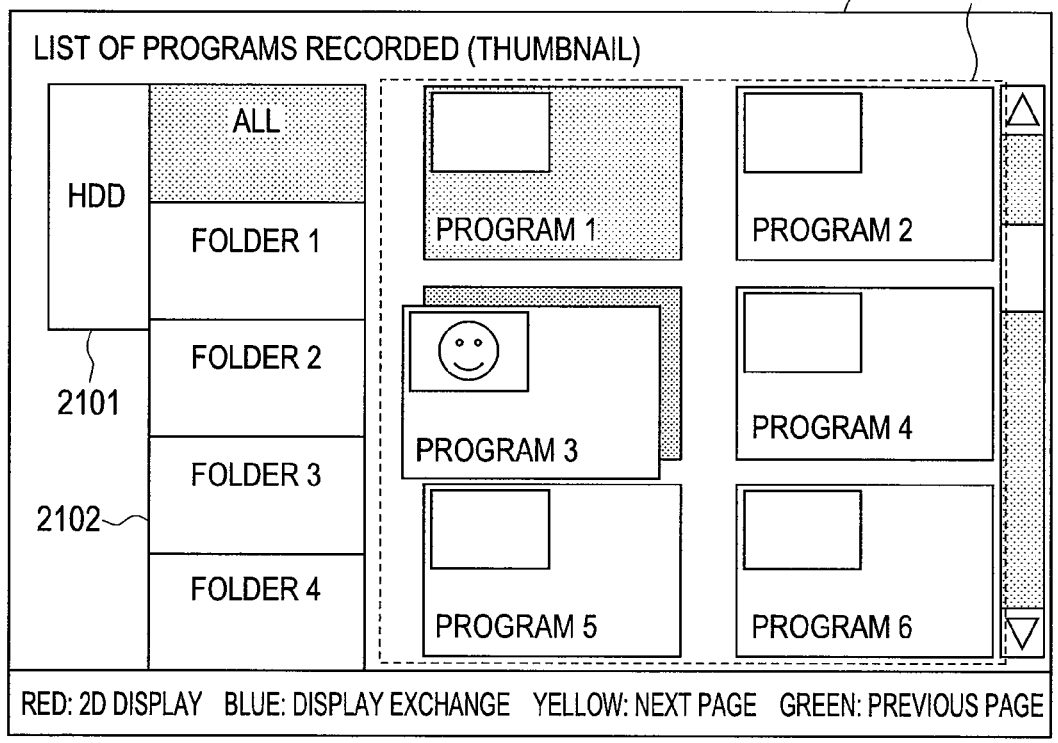

RECEIVER APPARATUS AND REPRODUCING APPARATUS

This application relates to and claims priority from Japanese Patent Application No. 2009-225867 filed on Sep. 30, 2009, the entire disclosure of which is incorporated herein by reference.

BACKGROUND OF THE INVENTION

The technical field relates to a receiver apparatus for receiving digital information through a broadcast or a network, etc., and a reproducing apparatus for reproducing the digital information, as well.

With such technical field a mentioned above, in the following Patent Document 1 is described, "For obtaining an electronic program guide display method for enabling a viewer to operate searching and/or selection of a program content intuitively, by making a three-dimensional (3D) display of an electronic program table on a display screen in manner", as a problem to be dissolved, and as a means for dissolving, there is described "By further adding an axis of date in the direction of depth, onto a two-dimensional program table, which is constructed with a time axis and an axis of a broadcast station, a program table is displayed on the display screen in such that a cursor can be moved in all axis directions. Also, by changing a surface of the 3D program table, on which a picture appears, it can be displayed as a program table by data, a program table by station and a program table designated by a time zone. With this, since the operation for program selection can be made in a manner similar to the operation of taking out a thing in a real world, by chaining the display surface of one program table and moving of the cursor in a 3-D space, it can be done, intuitively."

PRIOR ART DOCUMENTS

Patent Documents

[Patent Document 1] Japanese Patent Laying-Open No. 2001-169197 (2001).

BRIEF SUMMARY OF THE INVENTION

However, with the method of the Patent Document 1, it cannot be said that the user can find the program of her/his desire, easily, from the electronic program table, and it cannot be said that a graphic display is done in a user-friendly manner.

Also, not limiting to the electronic program table, but also with a receiver apparatus of a digital signal, it is a problem to be dissolved, of achieving a graphic display, being preferable for a user in usability thereof (i.e., user-friendly).

For dissolving such problem as was mentioned above, according to an embodiment of the present invention, there is applied a technical idea described in the pending claims, for example.

According to the means mentioned above, it is possible to achieve the graphic display, being preferable for a user in usability thereof (i.e., user-friendly) in a receiver apparatus of the digital signal, and thereby improving the usability for the user.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is an illustrative view for showing an example of a display of an electronic program table;

FIG. 6A is an illustrative for showing an example when switching valid/invalid of a 3D display of the electronic program table;

FIG. 6B is an illustrative for showing an example when switching valid/invalid of a 3D display of the electronic program table;

FIG. 8 is an illustrative for showing an example of the display of the electronic program table;

FIG. 11A is an illustrative for showing an example of the display of the electronic program table;

FIG. 11B is an illustrative for showing an example of the display of the electronic program table;

FIG. 11C is an illustrative for showing an example of the display of the electronic program table;

FIG. 11D is an illustrative for showing an example of the display of the electronic program table;

FIG. 11E is an illustrative for showing an example of the display of the electronic program table;

FIG. 11F is an illustrative for showing an example of the display of the electronic program table;

FIG. 12 is a flowchart for showing an example of processing steps when displaying the electronic program table;

FIG. 13A is an illustrative view for showing an example of switching of the display of the electronic program table;

FIG. 13B is an illustrative view for showing an example of switching of the display of the electronic program table;

FIG. 14A is an illustrative for showing an example of the display of the electronic program table;

FIG. 14B is an illustrative for showing an example of the display of the electronic program table;

FIG. 17 is an illustrative view for showing an example of a list display of a result of program search;

FIG. 20 is a block diagram for showing an example of a receiver apparatus;

FIG. 21A is an illustrative view for showing an example of a list display of recorded programs; and FIG. 21B is an illustrative view for showing an example of a list display of recorded programs.

DETAILED DESCRIPTION OF THE PREFERRED EMBODIMENTS

Figure 1:
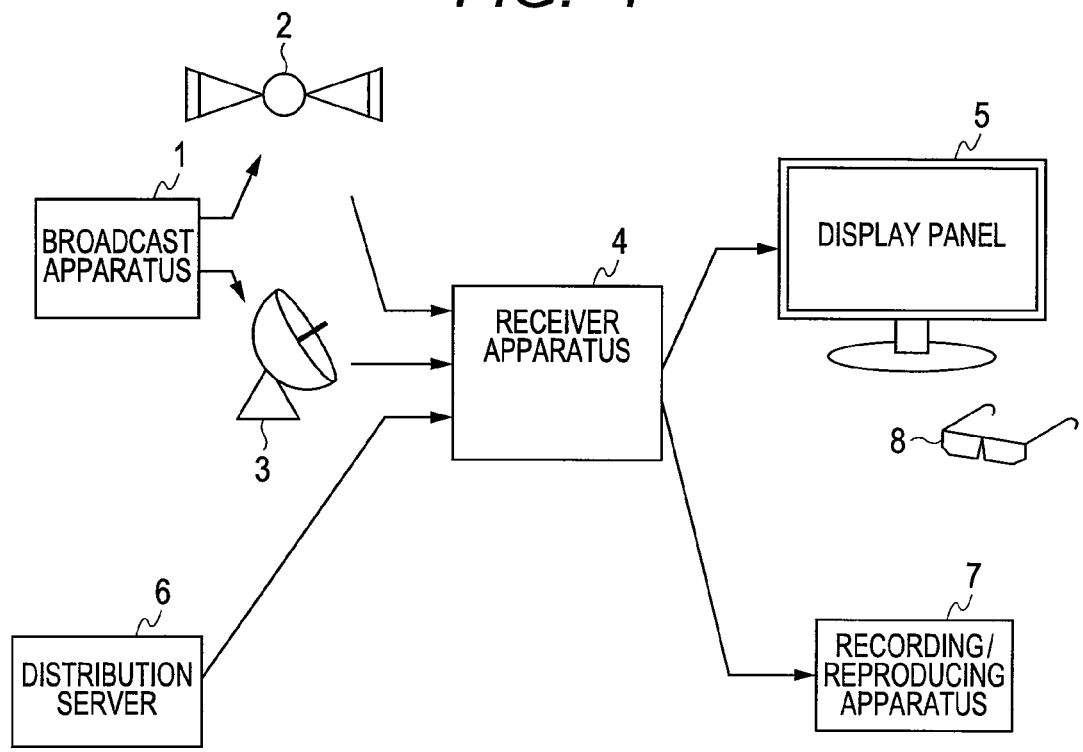
FIG. 1 is an illustrative view for showing an example of a system configuration.

In recent years, a demand increases upon the video display with stereoscopy (i.e., three-dimensional/3D). For achieving this, there is necessity that a delivery or transmitter apparatus transmits a program for use of a cubic or stereoscopy display, and that a receiver apparatus is compatible with the cubic display, for example, if considering reception of a broadcast. Or alternatively, if it is a reproducing apparatus, it needs to read out contents for the cubic display from a recoding medium, such as, a Blu-ray Disk®, etc., for example, and also must be enabled with the cubic display.

With any one of those apparatus, it is possible for a user to bodily sense high ambience and dynamic expression, which cannot be obtained with 2D display, by conducting the 3D video display. In those apparatuses for conducting the 3D display, when transmitting/displaying a 3D program on the air, for example, it is required that there is no sense of incompatibility when displaying the program to be displayed 3D and the electronic program table (it may be also expressed by "EPG" (Electrical Program Guide)) at the same time, and/or that the user can find the 3D program on the electronic program table, easily.

Also, not limiting to the electronic program table, but also when displaying a graphic (for example, a menu or a program list, etc.), which is unique to the receiver and may be called OSD (On Screen Display), it is required to give no sense of incompatibility when displayed together with the program/contents to be displayed in 3D, by displaying it in 3D, and to improve the usability of the user much more than when displaying it in conventional 2D.

And, the user is able to make the following operations, such as, searching a program that she/he wishes to view by referring to the electronic program table, or making a reservation of recording a program to be on the air after the present time from the electronic program table if it is a receiver apparatus installing a recording medium and has a recording function (in the digital broadcast, since program information of a schedule of broadcasting in the future, such as, one (1) week ahead, is included within a stream to be delivered from a broadcast station, and it is delivered or transmitted therefrom, it is possible to receive that program information so as to grasp contents thereof, and display the electronic program display, on a display apparatus).

In recent years, this electronic program table is enlarged or swollen accompanying an increase of a number of receivable broadcast stations (i.e., a channel number), and it brings about a problem that it is difficult to find a desirous program for a user, then it is considered that a device or means is necessary for increasing the usability of the electronic program table, with using a method more intuitions of displaying/presentation, so as to move or attract a viewpoint of the user directly to a program to be attention, etc.

Hereinafter, explanation will be made on an example of preferable mode of an implementation (e.g., an embodiment) of the present invention. However, the present invention should not be restricted to the present embodiment.

Embodiment 1

System

FIG. 1 is an illustrative diagram for showing an example of the configuration of a system, into which the present embodiment is applied. There is shown an example, in case of receiving information from a broadcast wave. However, not limited to the broadcast, it may be an IP broadcast (multi cast) with using a communication network, and is called, "distribution", collectively.

A reference numeral 1 depicts a transmitter apparatus disposed at an information providing station, such as, a broadcast station, etc., 2 a satellite for use of broadcasting, 3 a relay apparatus provided as a terrestrial or ground relay station, and 4 a receiver apparatus provided within a house or a residence of a user, respectively. A reference numeral 5 depicts a display panel for displaying the broadcast received, and 6 is a distribution server for distributing data for use of IP broadcast. A reference numeral 7 is a recording/reproducing apparatus disposed within the house or residence of the user, such as, a BD recorder, etc.

A reference numeral 8 is glasses for exclusive use for 3D view, which is necessary depending on a method for achieving the 3D. Thus, depending on a method of the cubic video display, the user needs to wear the glasses for use the cubic video viewing.

The transmitter apparatus 1 transmits signal wavers modulated, through the relay apparatuses 2 and 3. It is also possible to apply, for example, transmission by a cable, transmission by a telephone line, etc. This signal wave received by the receiver apparatus 4 is demodulated to be an information signal, as will be mentioned later. Also, a user is able to view/listen video/audio that the information signal shows, by connecting a display shown by the display panel 5. When the display is built within the receiver apparatus 4, she/he is able to view/listen the video/audio that the information signal shows on that display.

Also, the receiver apparatus 4 is able to transmit the information signal received to other recording/reproducing apparatus 7. This operation may also be called, a network distribution or an upload.

<Transmitter Apparatus>

Figure 2:
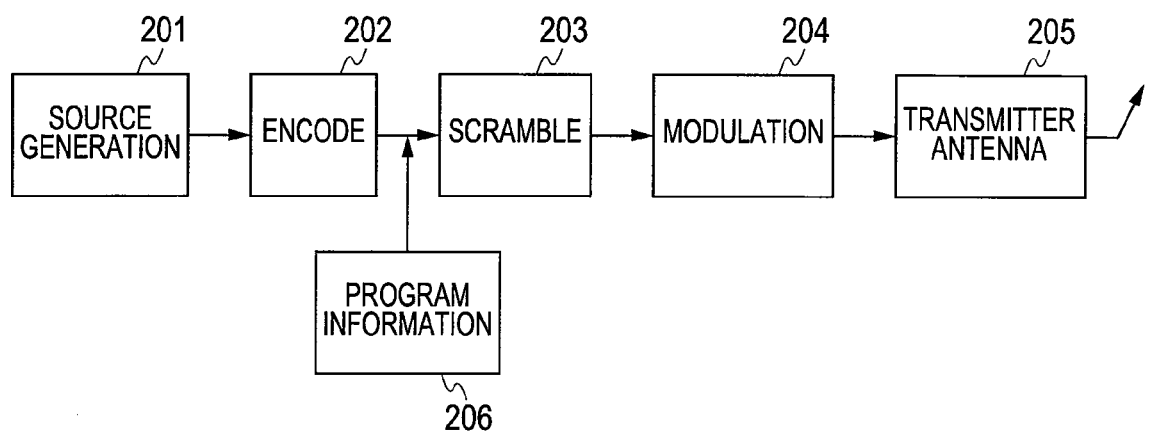
FIG. 2 is a block diagram for showing an example of delivering or transmitting process within the broadcasting apparatus.

FIG. 2 is a block diagram for showing an example of the structure of the transmitter apparatus 1.

A reference numeral 201 depicts a source generator portion, 202 an encode portion for executing compression with a MPEG method or the like, 203 a scramble portion, 204 a modulator portion, 205 a transmission antenna, and 206 a program information supply portion, respectively. The information generated in the source generator portion 201 made up with a camera, or a recording/reproducing apparatus, etc., such as, video/audio or the like is treated with compression of the data volume within an encode portion 202, so that it can be transmitted with occupying a lesser band. Depending on necessity thereof, it is encoded for transmission, so that it is visible/audible for a specific viewer within the scramble portion 203. After being modulated into a signal suitable for transmission within the modulator portion 204, it is transmitted from the transmission antenna 205 towards the relay apparatus 2 in the form of a radio. In this instance, within the program information supply portion 206 is added the program information to it, for displaying the electronic program table or displaying the program information during being viewed at present.

However, in many cases, a plural number of information are multiplexed on one (1) radio, with using a method, such as, time-division or a spectrum diffusion method or the like. Though not shown in FIG. 2 for simplicity, but in that case, there are plural numbers of systems, each including the source generating portion 201 and the encode potion 202 therein, and between the encode portion 202 and the scramble portion 203 is disposed a multiplex portion (a multiplexer portion) for multiplexing the plural number of information therein.

As a method for achieving transmission/reception, there may be various kinds of method to be applicable. For example, as an example of delivering or transmitting 3D video, there is a method of multiplexing video data for the left eye and video data for the right eye, thereby to deliver or transmit them. Not limited only to this, but if a working mode of transmission and reception can be so determined that to be distinguishable when it is received, then the receive apparatus can determine that it is a cubic video depending on the working mode, and thereby displaying that cubic video.

<Receiver Apparatus>

Figure 3:
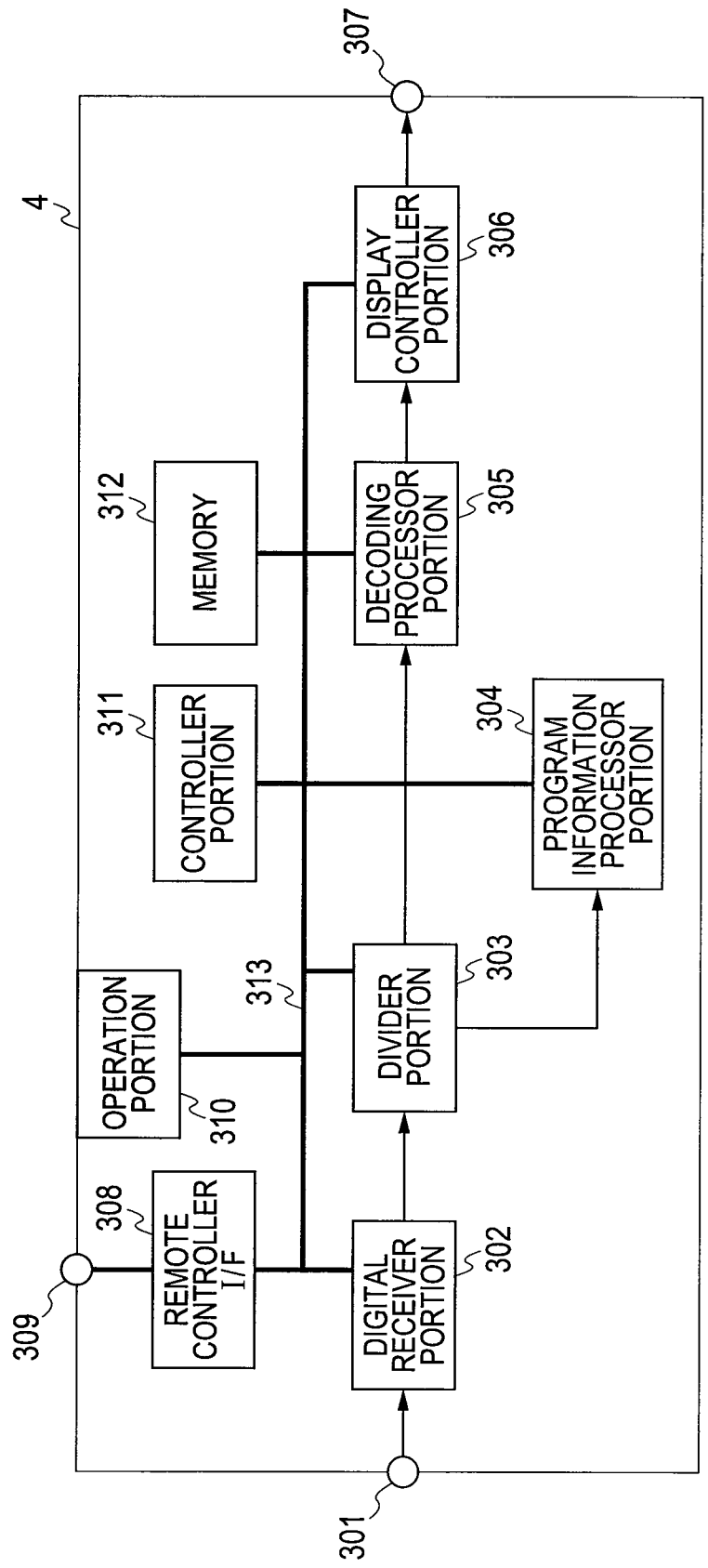
FIG. 3 is a block diagram for showing an example of a receiver apparatus.

FIG. 3 is a block diagram for showing an example of the structure of the receiver apparatus 4 for implementing the present invention. A reference numeral 301 depicts an input terminal for receiving transmission data from the broadcasting apparatus 1. A reference numeral 302 depicts a divider portion for analyzing and dividing the data received into each kind of data, so as to transmit them to the latter stages. Thus, it executes a descramble process depending on the necessity thereof, and thereby decoding it to be visible/audible. As a process of division, detection is made on PAT (Program Association Table) data having a predetermined ID in advance among the data, and analysis is made on it upon basis of a predetermined method; thereby obtaining PMT (Program Map Table). With using that information, next, detection is made on the PMT data from input data, and analysis is made upon basis of a predetermined method, and then it is possible to know ID of the data (for example, EIT), including the video data and the audio data, the program information (may be also called, "SI data") therein. With the mentioned above, it is possible to classify the data separately, into each kind thereof, and for example, video data/audio data is extracted therefrom, to be transmitted to a program information processor portion 304. The program information processor portion 304 analyzes the program information extracted from an input stream, and memorizes necessary data into a memory 312, etc., for example. For example, it is such data, for example, a program title, a broadcast channel number, a broadcast start time, a broadcast end time, details of program content, etc. Among of those information is included the information for building up the electronic program table.

A decoding processor portion 305 displays the video data/audio data, which are divided, or decodes into data to be outputted from a speaker. However, within the decoding processor portion are provided blocks, separately, for executing a decoding process upon the video and the audio, respectively. The data decoded is transferred to a display controller portion 306.

The reference numeral 306 depicts the display controller portion for producing output data, from the video/audio data and display data of an interface (IF) for various kinds of applications. For example, a picture to be displayed is produced by piling up the OSD, such as, a menu screen prepared by the receiver apparatus 4 individually, for example, on the video data, which is processed in the decoding processor portion 305, and so on. It is assumed that the display controller portion 306 is able to deal with at least one (1) or more of 3D video display methods.

A reference numeral 307 depicts an output terminal, through which data produced is transferred to a display device, such as, a liquid crystal panel for use of display, etc. A reference numeral 308 depicts a remote controller IF when a user makes operations with using a remote controller. A reference numeral 309 depicts a light receiver portion for receiving a signal from the remote controller, for example. A reference numeral 310 depicts an operation portion, arranging thereon a group of buttons for various kinds of operations, such as, a station selecting operation, a sound volume operation, etc., for example, for the user to control of the receiver apparatus 4 by operating the button(s) directly. A reference numeral 311 depicts a controller portion for controlling operations of the receiver apparatus 4, and it is constructed with a CPU, for example. A reference numeral 312 depicts a non-volatile memory for memorizing information therein. A reference numeral 313 is a system bus for transmitting control commends between the blocks.

Further, lines shown by arrows, connecting between the blocks in FIG. 3, show flows of digital data. Since the process is executed, appropriately, in each of the blocks, the data flowing between the blocks differs from, in particular, in content and a format thereof.

Although the explanation was given in the above, upon the receipt of the broadcast from the transmitter apparatus 1, as an example thereof, however, when receiving a stream from a distribution server 6, for example, via a network, there are cases where the program information data is included in a stream independent from the video/audio data (it may be also called "metadata"). In such case, the program information is obtained from the metadata within the divider portion 302, and the data is transmitted to the program information processor portion 304, thereby it is possible to apply the embodiment given below therein, in the similar manner when receiving the broadcast. Further, it may be described in the metadata, i.e., whether the corresponding distribution contents are of 3D or not.

Explanation will be made on the following example, upon basis of the structure mentioned above. It is assumed that information for determining on which program includes the 3D video is included within the digital information received. For example, it can be considered that transmission is made including the information indicating on whether the 3D video is included or not in the program, within EIT. However, not limited to EIT, but if the working mode is determined to be distinguishable when being received, then the receiver (program information processor portion 304 and the controller portion 311) determines it; thereby obtaining the same effect.

<3D Display Method>

As one of the method for displaying the 3D video, there is a method of using polarization. Thus, it is the method, while the display is made with a method, such as, a linear polarization (difference of 90 degree is provided between the picture for the left eye and the picture for the right eye in the polarizing direction) or a circular polarization (the picture for the left eye and the picture for the right eye are reversed in the orating direction of a polarization axis), the user wears the glasses for exclusive use, with which filters are provided corresponding to the polarizing lights on the left and the right, so that pictures having parallax therebetween reach to the eyes, respectively; thereby showing the picture jumping or projecting out.

As other one method for achieving the 3D display, there is also a method that the user wears shutter glasses. The picture for the left eye and the picture for the right eye are multiplexed, on a stage of transmitting the stream, and the receiver apparatus receives it. The picture for the left eye and the picture for the right eye having the parallax therebetween are displayed, switching or exchanging alternately, and the shutter glasses are so controlled that each penetrates the picture through a liquid crystal installed on a lens portion thereof, alternately for the right eye and the left eye, in synchronism with a control signal from the receiver apparatus, and thereby achieving the cubic display.

As other one method for achieving the 3D display, there is also a method of using a color separation (or, also called a "color division"). Each one of the pictures for the left and the right is divided into pictures different in combination of colors, such as, a red and a blue, a red and a green, etc., for example, and the pictures are shifted at the display positions thereof, in the horizontal direction; thereby producing the parallax therebetween. In this method, the user also uses the glasses for exclusive use thereof, on which different color filters are disposed for the left and the right respectively, and she/he can bodily sense the cubic display produced due to the parallax.

As further other one method for achieving the 3D display, there is also a method for the user to obtain a stereognostic sense through viewing with her/his bear eyes, such as, represented by a lenticular method, a parallax/barrier method, for example. In this case, as a display picture are displayed the picture for the right eye and the picture for the left eye, alternately, and with provision of a filters having a special configuration on a display screen, the respective pictures can reach to the both eyes. In case of those method, there is no necessity for the user to wear the glasses for exclusive use thereof.

As was mentioned in the above, there are many methods, as a method for achieving the 3D display, however, in the present invention, it is enough that the display video of electronic program table can be produced, corresponding to that, even if it may be any one of the 3D display methods, such as, the method introduced in the above, and also that with which the receiver apparatus is enabled, and it is enough to consider that it can be achieved by the controller portion 311 and the display controller portion 306.

For that reason, an argument relating to a polarizing filter and/or a phase difference plate on the video display screen, which are necessary for the specific method(s) will be omitted herein. For example, in case of the method of using the shutter glasses mentioned above, the display videos for the right eye and the left eye are produced, alternately, in the similar manner when receiving the broadcast, and a video of the electronic program table having the parallax is produced and displayed, and thereby enabling to produce the 3D display electronic program table. In an example, which will be given below, explanation will be made upon basis of a presumption of this method.

<Display of Electronic Program Table>

An example is shown in FIG. 4, i.e., a display of the 3D broadcast programs, which are emphasized by receiver apparatus 4, when it displays the electronic program table. In this figure is presented a condition where the user has a stereoscopic vision with combining the picture for the right eye and the picture for the left eye.

Figure 5:
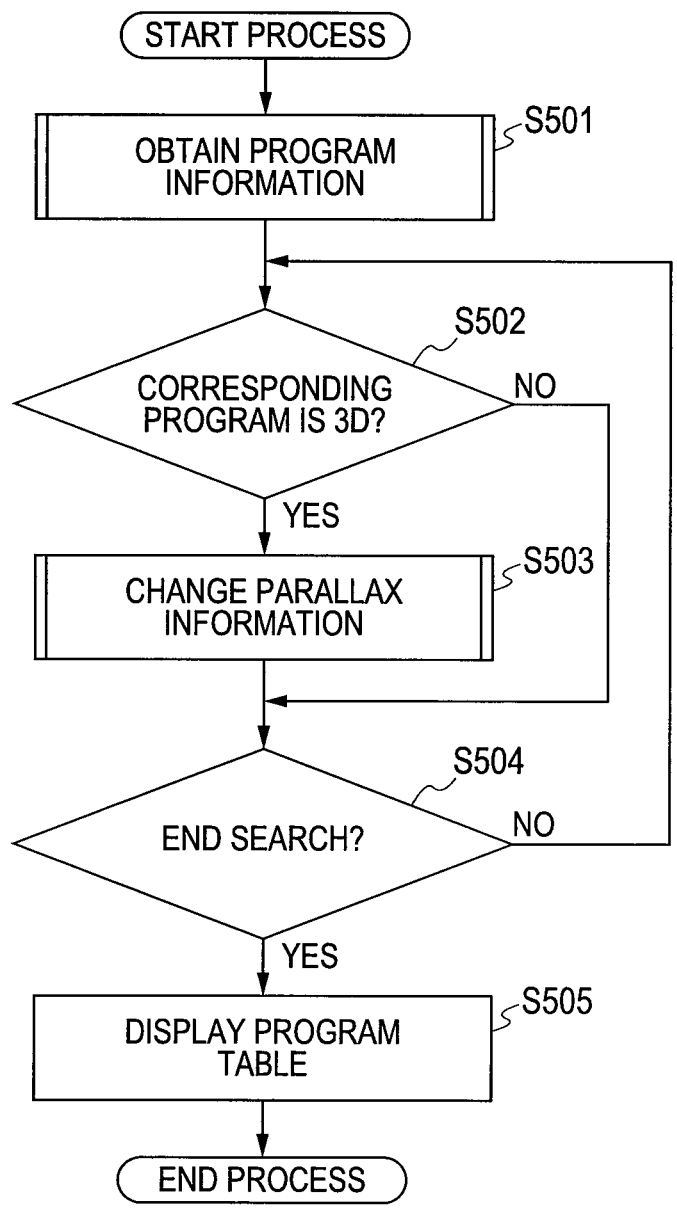
FIG. 5 is a flowchart for showing an example of processing steps when displaying the electronic program table.

A reference numeral 51 depicts a video display portion of the display panel 5. In the present figure, the controller portion 311 displays the electronic program table, with using a whole surface a display portion, responding to a predetermined operation from the user. The program information shown by 401 is the information of the 3D broadcast programs, and is displayed to be seen jumping or projecting out therefrom. In this instance, in a portion 402 are shown the details of the program, upon which the user brings a focus on the program table in a lower stage, but it may be displayed, jumping or projecting out from a column for explaining the program shown by 402, when she/he brings the focus on a 3D broadcast program. A flowchart of the processes within the receiver apparatus 4 will be shown in FIG. 5.

In a step (hereinafter, being abbreviated "S") 501, the controller portion 311 calculates a display region from present time information and view channel information when opening the program table responding to the user operation inputted from a remote controller IF 308 or an operating portion 310, and obtains the program information to be displayed from a volatile memory 312, and it further produces electronic program display video data for the right eye and the left eye, thereafter the process advances into S502.

In S502, it is determined on whether content of the program information data included in the display region is the 3D broadcast or not for each program. Determination is made on whether each program is the 3D broadcast or not, for example, by making reference to that information, if the information for determining on whether that program is the 3D or not is included at a predetermined position within the data stream. Or, it may be made by determining if a program title and/or character data indicative of being the 3D program are/is included or not. In case if the program is the 3D broadcast, the process advances into S503, and if it is not included, the process advances into S504.

In S503 is calculated a rectangular, on which the 3D program as a target should be displayed, and the parallax is determined by shifting the display positions of the video data for the left eye and the video data for the right eye on that portion, then the process advances into S504. The detailed method for determining the parallax is according to a cubic display method or technology mentioned above.

In S504, if a search on whether the 3D broadcast program is included or not is completed for all of the program information data on the display region, the process advances into S505, and if it is not completed, the process advances into S502. In S505, the display controller portion 305 displays the electronic program table data produced, in accordance with a predetermined method, and thereby completing the process. For example, the video for the left eye and the video for the right eye are displayed, alternately, and so on.

As shown by 403 in FIG. 4, a function for switching between such 3D display and 2D display may be assigned to a color button (red) of the remote controller, for example, so that the switching may be made at timing as a user desires. In case where the 3D display is OFF, the controller portion 311 produces the electronic program table data having no parallax, and the display controller portion 305 displays it.

Depending on a form of the cubic video display, the user needs to wear the glasses for exclusive use of the cubic display view. Accordingly, it is also desirable to improve the usability for a user by enabling the user to switch between 2D/3D, easily, by her/himself, depending on a situation where she/he wears the glasses or not. If the user is able to switch between the 3D display and the 2D display at any timing that she/he desires, for example, it is possible for the user to switch over the display, fitting to the situation, depending on whether that the user wears the glasses for exclusive user by her/himself or not.

As other method for switching over the display may be achieved, by producing a function menu, as is shown in FIGS. 6A and 6B, for example, and it is displayed to be selected by the user. FIG. 6A shows an example of a screen when rising up the function menu by a predetermined operation under the condition where the 3D display is OFF. When the user selects an item of the 3D display among the function menu, then the controller portion 311 and the display controller portion 305 switches to the 3D display.

FIG. 6B shows an example of a screen when displaying the function menu under the condition where the 3D display is ON. By displaying the function menu itself jumping or projecting out, it is possible to view without generating a sense of incompatibility even if there is the program information displayed jumping or projecting out on a background surface thereof. When the user selects the item of the 3D display OFF, the controller portion 311 and the display controller portion 305 are switched into the 2D display.

Figure 7:
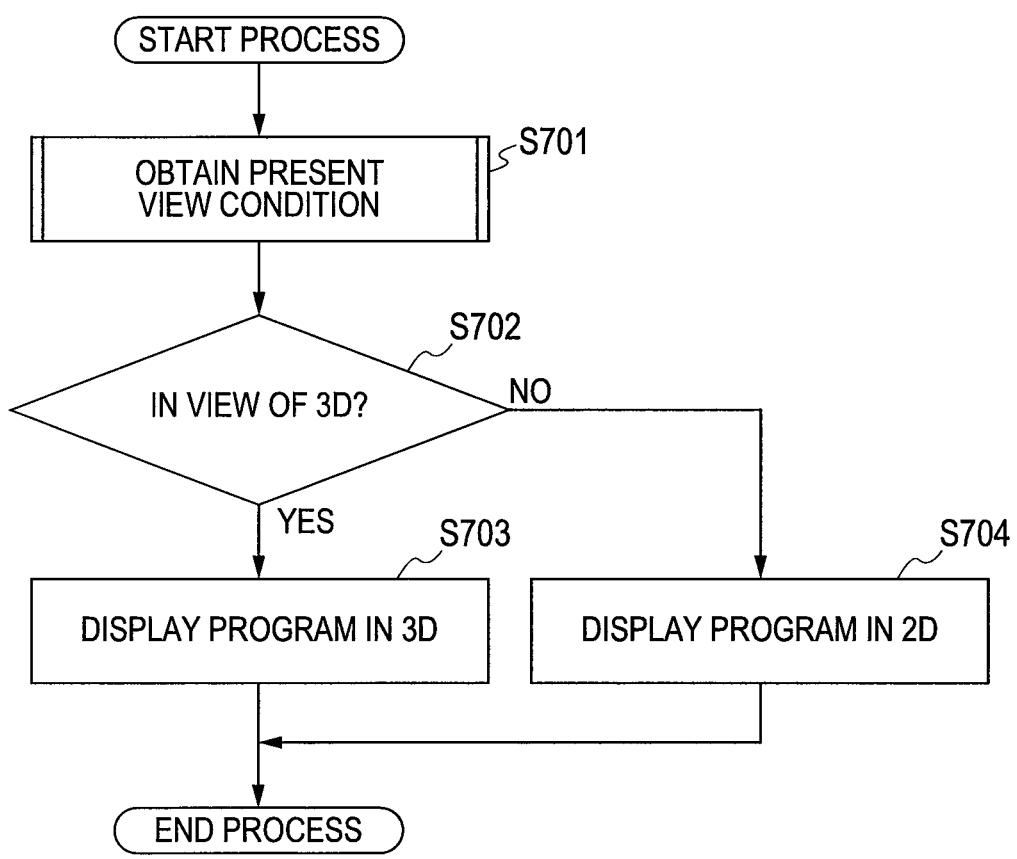
FIG. 7 is a flowchart for showing an example of processing steps when displaying the electronic program table.

In general, since the user wears the glasses for exclusive use and so on, during when the user views the 3D broadcast, it is considered to be preferable that the electronic program table is also effective on the 3D display thereof. FIG. 7 is a flowchart for explaining the operation of switching between validity/invalidity of the 3D display, autonomously, when displaying the electronic program table.

In S701, the controller portion 311 obtains present viewing condition, such as, the program information during when the user is viewing, and the display condition of the display controller portion 306, for example, and advances into S702. In S702, if the viewing condition is 3D (i.e., 3D broadcast is viewed on the 3D display), the process advances into S703, if it is 2D (including the case where the 3D broadcast program is displayed on the 2D display), the process advances into S704. In S703, the electronic program table is 3D displayed, as shown in the example mentioned above, and the process is completed. In S704, the electronic program table is 2D displayed, and the process is completed.

Further, by making an assumption upon case when rising up the electronic program table just after selecting 3D broadcast, accidentally (i.e., 3D viewing condition that she/he does not intend, as the user), it may be added into determination in S702, if the present program is viewed for a certain time-period or longer than that or not.

With this, it is possible to make a display fitting to the viewing condition of the user at a time point when initializing the electronic program table, and in particular, in case of a method of viewing the 3D video with using the glasses for exclusive use, there can be obtained an advantage that the user has no necessity of taking the trouble, i.e., wearing or taking out the glasses for exclusive use. Also, even in a bear-eye cubic method, since there is no switching between the 3D video and the 2D video, there can be obtained an advantage that fatigue of the eyes is reduced.

Also, with always memorizing the condition of validity/invalidity of the 3D display within the nonvolatile memory 312, etc., starting may be made with the setup being same to the previous time when displaying the electronic program table next time.

With the embodiment mentioned above, for the user it is possible to find the 3D broadcast program, intuitively, among the program table arranging a large number of programs thereon. It is also possible to achieve a view reservation/recording reservation of those broadcasts, for example, easily. Further, in case where the main body of the receiver apparatus has a recoding medium therein (not yet described in FIG. 3), the recording reservation may be made on that recording medium. Or, the main body of the receiver apparatus has a slot, into which the recording medium can be inserted (not yet described in the figure), there may be inserted a portable recording medium. Or, it may be recorded into the recording/reproducing apparatus 7, being connected with, for example, a HDMI cable or an IEEE 1394 cable, or connected upon basis of a format defined by a DLNA (Digital Living Network Alliance) with using an IP.

Figure 9:
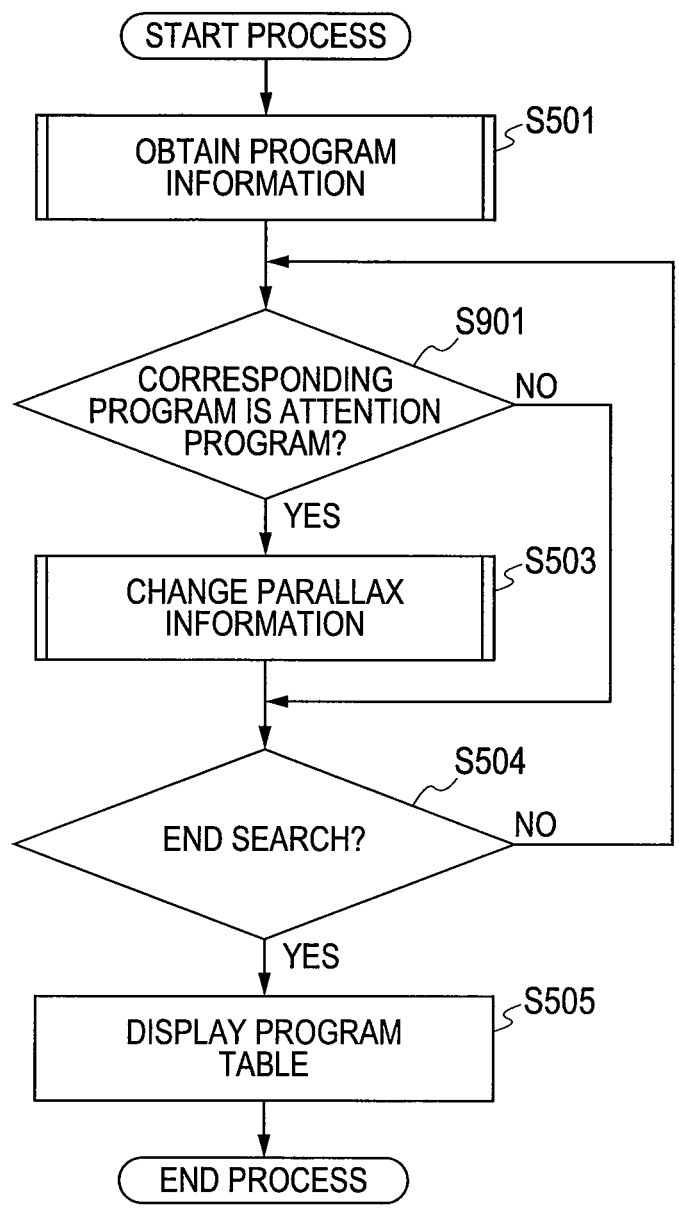
FIG. 9 is a flowchart for showing an example of processing steps when displaying the electronic program table.

Hereinafter, explanation will be given on an embodiment for further increasing the usability of the user (i.e., user-friendliness). First of all, explanation will be made on an example of utilizing a taste of the user. For example, an example of displaying a program, with an emphasis thereof, which is recommended by the receiver apparatus 4, with using a technology of analyzing the taste of the user, or searching the program information including a word(s) which the user designates, by referring to FIG. 8. Also, a flowchart of processes within the receiver apparatus 4, in this instance, will be shown in FIG. 9.

In S501, the controller portion 310 calculates a display region from the present time information and viewing channel information when opening the program table depending on the user operation, and obtains the program information necessary for the display, and the process advances into S901.

In S901, it is determined if there is a broadcast of program to be recommended or not, within the display region. Since there are large number of methods, as a method for determining on whether each program is the program to be recommended or not, it may be made in accordance with one (1) or more method(s) of those; however, for example, there can be considered a method for determining it from a view tendency of the user until that time (for example, with integrating genre or category information of the programs, which are viewed for a long time, a favorite genre or category is extracted through an analysis of a result thereof).

Or, also there can be considered a method, i.e., the user may designate a actor's name of her/his favorite with using the IF of the remote controller, etc., and then the controller portion 311 searches out that actor's name from the program information. If the corresponding one is the program to be recommended, then the process advances into S503, and if it is not, then the process advances into S504. In S503, a rectangular is calculated, on which the 3D program of a target is displayed, and the display positions of the video data for the left eye and the video data for the right eye of that portion are shifted so as to determine or set up the parallax, and the process advances into S504. The detailed method for determining the parallax is in accordance with the cubic display method mentioned above.

In S504, if the searching on whether it is the 3D broadcast program or not is completed, for all of the program information data within the display region, then the process advances into S505, but if it is not yet completed, then the process advances into S502. In S505, the display controller portion 305 display the electronic program table data produced with a predetermined method, and the process is ended. For example, the video for the left eye and the video for the right eye are displayed, alternately, and so on.

With this, for the user it is possible to find a program, which she/he wises to view, intuitively, among the program table arranging a large number of programs thereon.

As shown by 802, a function for switching between such 3D display and 2D display may be assigned to a color button (red) of the remote controller, for example, so that the switching may be made at timing as a user desires. For example, the user can switch the display fitting to the condition whether she/he wears the glasses for exclusive use or not. Or, as other method for switching the display, it may be achieved by producing such the menu, as is shown in FIGS. 6A and 6B. Also, when displaying the present electronic program table, selection may be made between 2D/3D, fitting to the fact on whether the display of the program is 2D or 3D, which was viewed before that.

Also, in this case, an amount or volume of parallax may be made variable depending on a degree of recommendation. Thus, the program, which is recommended, at the most is produced to jump up to the most front, and if ranking of ten (10) stages is made for each of the recommended programs, the display is made while distributing the ten (10) stages of parallax volume to them. Or, limiting to the programs to be recommended among the programs displayed on the program table on one (1) screen, the parallaxes may be distributed to them, sequentially, from a large parallax down to a small parallax, depending on degrees of the recommendation for each program.

With this, for the user, it is possible to notice the program, which is recommended by the receiver apparatus, intuitionally, and can find the program that she/he wishes to view, easily.

Figure 10:
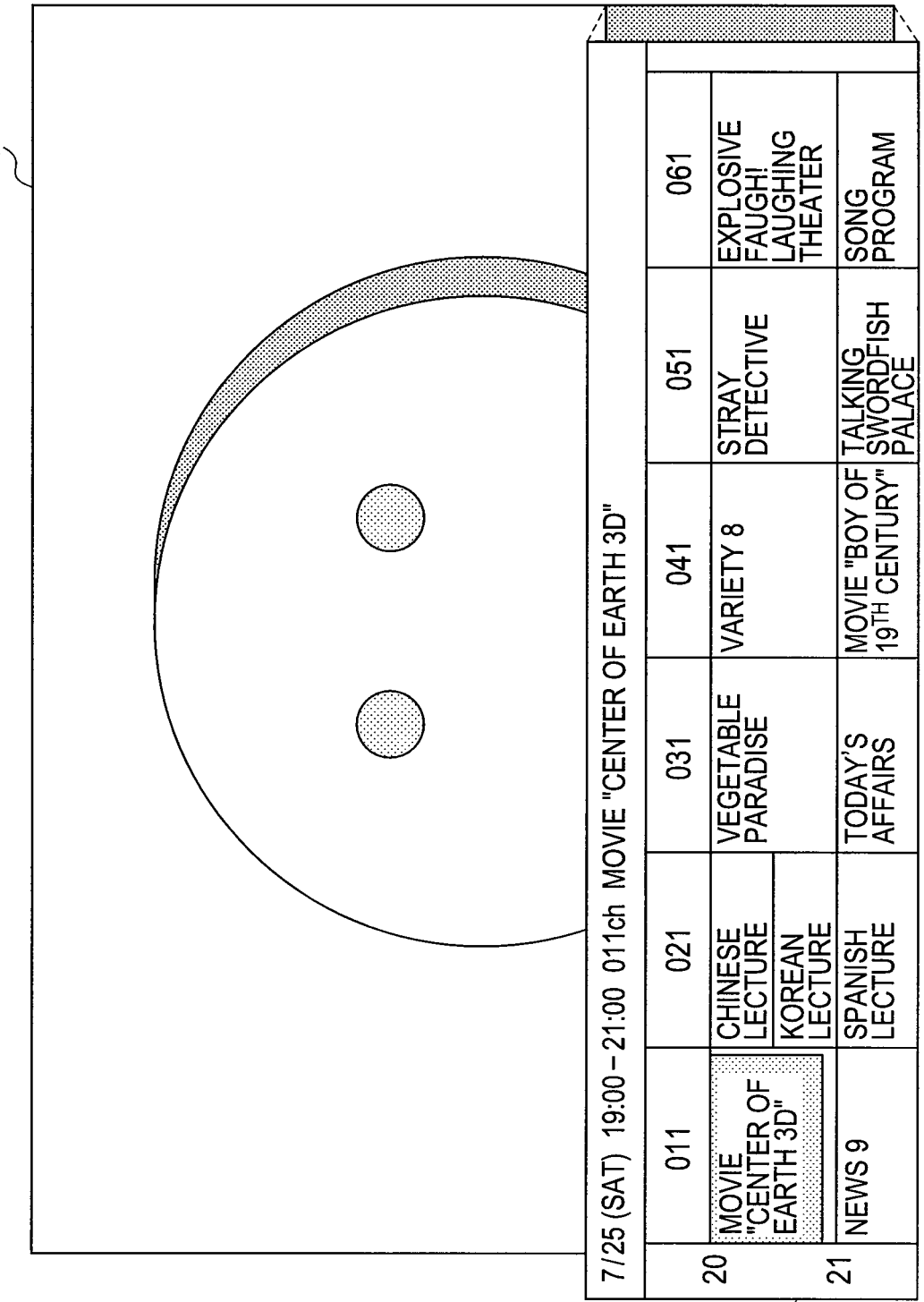
FIG. 10 is an illustrative for showing an example of the display of the electronic program table.

Next, explanation will be given on an example, displaying the program table with using a part of the screen, continuing the display of the program, which the user is now viewing, by referring to FIG. 10. A reference numeral 51 depicts a display screen of the display panel. A region shown by 1001 is the electronic program table. When the user is viewing the 3D video, if displaying the program table with determining the volume of parallax in such that it jumps or projects out further in a front with respect to the jumping or projecting out of the 3D video as the background surface, it is possible to make a display without generating a sense of incompatibility even if combing with the 3D video displayed.

A sequence of display of the program table in this instance is analogous to that shown in FIG. 7. However, in S703, for example, the controller portion 311 may provide the maximum parallax within a capable region between the video for the right eye and the video for the left eye, and the display controller portion 315 may display them, so as to display the program table in 3D, and thereby completing the process. With determining the parallax up to the maximum, it is possible for the user to view the table without generating the sense of incompatibility even in the case of displaying the video on the background surface jumping or projecting out. Also, for example, the controller portion 311 may determine the parallax larger than the volume of parallax, which is determined for the video on the background surface, and the display controller portion 315 may display, so as to display the program in 3D, and thereby completing the process.

For example, when reproducing 3D contents, which are stored in a recording medium, such as, a BD or a DVD, from the recording/reproducing apparatus 7 connected with the HDMI cable, etc., it is also possible to obtain the same effect if executing the similar process thereon.

Next, an example will be shown of displaying the programs of 3D within the program table, as a line of the respective lines thereof, by referring to FIGS. 11A to 11F.

A reference numeral 51 depicts a display screen of the display panel. A reference numeral 1101 depicts a display portion of the program list for displaying only the 3D programs. In the example shown in FIGS. 11A to 11F, a fact that the 3D broadcast will be made on 011 channel from 19:00 is described in an independent line, so that the user can easily find the 3D broadcast program. A time zone being vacant in the column thereof means that there is no 3D broadcast program.

In this time, for example, with assigning a function of switching displays between ON/OFF on a line of 3D programs to a button of the remote controller (in FIGS. 11A to 11F is shown an example assigning it to the red button of the remote controller), the user may switches between presence/absence of the display by pushing down that corresponding button, or may display it always. In the example shown in FIGS. 11A to 11F, the display is not made with providing the parallax; however, the controller portion 311 may determines the parallax so that only the line of the 3D program shown by 1101 can be seen jumping or projecting out to a front surface.

Also, in case where plural numbers of 3D broadcast programs are made within the same time zone, as is shown in FIG. 11B, such a display may be made that it is possible for the user to see that there are plural numbers of 3D broadcast programs, for example, by displaying lines differing the color thereof, as is shown by 1102, while displaying the program contents for one (1) program. The program content, being switched over the display thereof (FIG. 11C), is displayed at first, by the fact that the user selects this portion, through an operation of the remote controller, etc. In this instance, also it is indicated that there is/are other 3D program(s) by display the lines differing the color thereof, such as shown by 1103, etc. Or, as is shown in FIG. 11D, the 3D programs on the same time zone may be displayed horizontally on a list display line.

A display sequence is shown in FIG. 12. In S501, the controller portion 311 calculates the display region from the present time information and the viewing channel information when opening the program table responding to the user operation, so as to obtain the program information necessary for display, and advances into S1201. In S1201, the 3D program(s) is/are searched and obtained from the program information of all channels other than the display region, on the display time zone, and the process advances into S1202. In S1202, the electronic program table data for display is produced, by renewing the display data of the portion corresponding to the 3D program display portion of the program table, and the process advances into S505. In S505, the display controller portion 305 displays the electronic program table data produced in accordance with a predetermined method, and the process is completed.

However, in case when producing the program table at timing just after starting or initializing the receiver apparatus, there may be a possibility that obtaining of the program information of all channels is not yet completed. In this case, display is made by extracting data of the 3D program from the information, up to where it can be obtained, and renewal may be made on the screen, appropriately, every time when the 3D program can be found.

Also, though the electronic program table is shown in 2D in the explanation given in the above; however, when displaying this in 3D, there are also methods for implementation, as shown in FIGS. 11E and 11F. Thus, display is so made that the data is aligned while changing depth on the time zones where the programs piles up in plural numbers thereof. For example, depending on a predetermined operation of, such as, the left and the right keys of the remote controller, for example, display of the program displayed on the most front surface is made in an exchangeable manner, such as, from FIG. 11E to FIG. 11F, or vice versa, for example. Of course, it is also possible to obtain the same display and to switch the display by the user operation, even if there are three (3) or more of programs piling up on one another.

With the present embodiment, it is possible for the user to notice the 3D program(s), easily, even if it/they is/are the program(s) of a broadcast station(s), which is/are not included within the display region, and thereby to make the operation, such as, viewing or recoding reservation, etc., easily.

Next, an example will be given in case when changing sizes of the program table, in particular, when displaying the electronic program table in 3D, by referring to FIGS. 13A and 13B.

In FIG. 13A is shown the display of the program data for four (4) hours of six (6) channels. On the other hand, in FIG. 13B is shown the display of an enlarged program data for two (2) hours of three (3) channels, which are enclosed by broken lines, thereby showing much more details of each of the programs therein. In this instance, for the purpose of enlarging the data displayed jumping or projecting out in FIG. 13A, the parallax volumes of the video for the right eye and the video for the left eye are increased fitting to a ratio of enlargement in FIG. 13B, and thereby achieving the 3D display without generating the sense of incompatibility when switching.

On the other hand, when transiting the condition from FIG. 13B to FIG. 13A, the parallax volumes are reduced depending on a ratio of reduction, and thereby achieving the 3D display without generating the sense of incompatibility when switching. Of course, it is also possible to deal with by the similar control, even when enlargement/reduction is executed on the channel/time number other than those shown in the present embodiment, or when it is executed on a large number of stages.

Next, explanation will be given on an example of displaying programs after the present time on a specific broadcast station (or a channel), for a plural number of days, on the electronic program tale, by using FIGS. 14A and 14B. It is assumed that selection of the specific broadcast station is made, for example, by the user, while assigning it to an arbitrary button of the remote controller.

In FIG. 14A is shown an example where the parallax is produced about a place or point, at which the 3D program will be broadcasted, and the display is made to be seen jumping or projecting out. With this, it is possible for the user to understand, intuitionally, that a 3D broadcast(s) will be made or not, ahead of the present time on the channel designated. In FIG. 14B, with the similar display, it is possible for the user to find the program, intuitionally, fitting to her/his taste. With this, it is possible to attract or collect an attention of the user onto those programs, naturally, and thereby to execute the recording reservation and the viewing reservation of the program, easily.

It is also possible to implement the present invention by combining the respective embodiments mentioned above, appropriately. Thus, it is possible to increase an ability of looking much more, for example, by combining the method of enlarging/reducing, as was explained by referring to FIGS. 13A and 13B, during when conducting the display as shown in FIG. 4, or by reducing the display data size of the list of the broadcast programs of the same broadcast station, as was shown in FIGS. 14A and 14b, etc. Display with an arbitrary combination and transition of the condition may be conducted.

Also, as a variation can be considered to attract the attention of the user by displaying the position where a cursor locates ahead, for the purpose of emphasizing the display thereof, or by displaying all the programs of a certain broadcast station ahead, thereby increasing the usability thereof.

With the embodiment mentioned above, the explanation was given about the method for displaying the electronic program table when the 3D program is broadcasted. There can be achieved a display of the electronic program table being superior in the usability thereof, with which the user can find the 3D program, easily, on the electronic program table. Also, there can be achieve a display of the electronic program table without generating the sense of incompatibility, even when displaying the electronic program table together with the program to be displayed in 3D, at the same time. Also, if a viewing method of the cubic picture needs the glasses, in the type thereof, switching can be made between 2D and 3D, easily, and thereby enabling to increase the usability or user-friendliness thereof.

Figure 15:
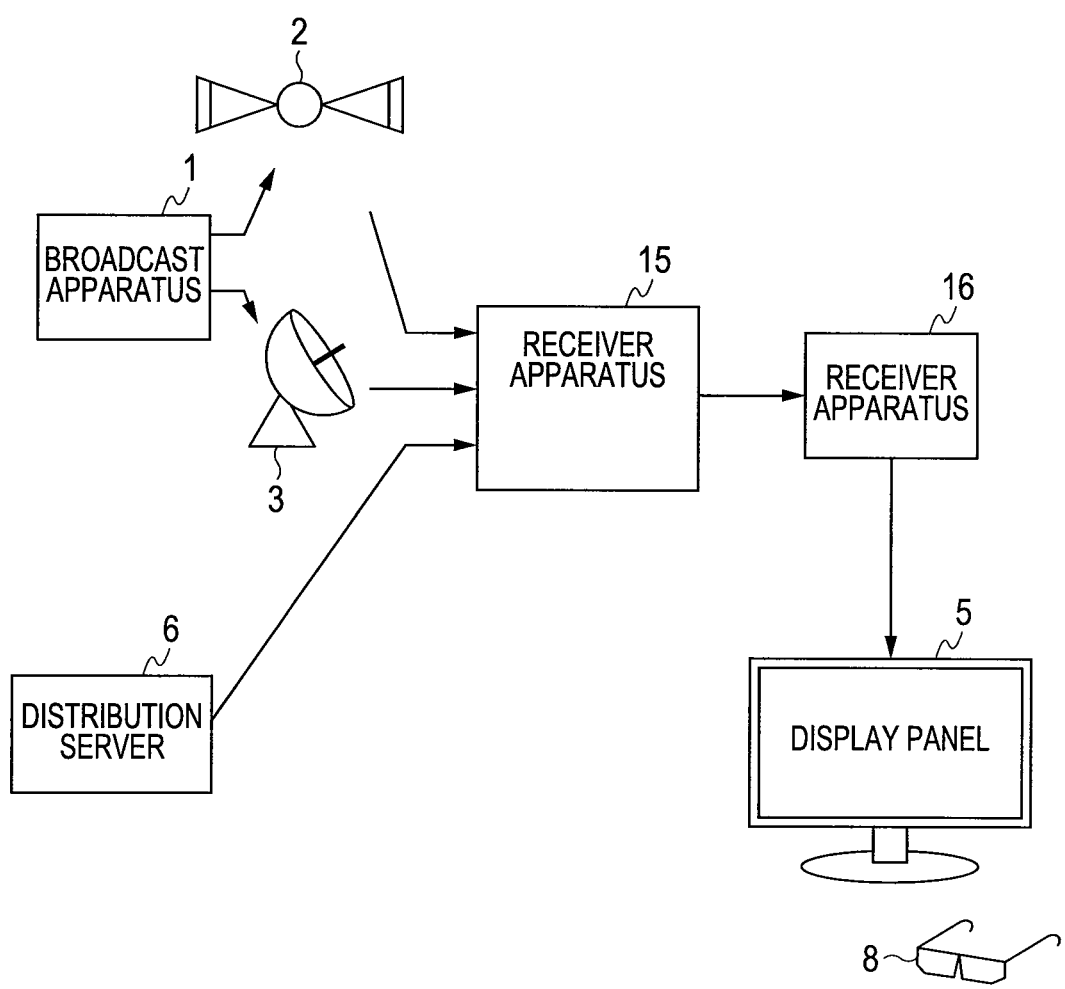
FIG. 15 is an illustrative view for showing an example of a system configuration.

Next, explanation will be made on the process within a system other than the system, which was explained heretofore. Herein, explanation will be made on a case where the receiver apparatus provides data output data towards not to the panel, but to other receiver apparatus (or, a recording/reproducing apparatus), by referring to FIG. 15 and those thereafter. This FIG. 15 is a view for showing the system configuration, in particular, the connection of the receiver apparatus 15, as another embodiment of the present invention.

The receiver apparatus 15 receives data transmitted from the transmitter apparatus 1 and the distribution server 6. The receiver apparatus 15 decodes the received data and produces the display screen of the electronic program table within an inside thereof; then it outputs the data to the different receiver apparatus (or, may be the recording/reproducing apparatus) 16.

Connection between the receiver apparatus 15 and the receiver apparatus 16 is conducted in accordance with a method of transmission of the digital data, within which the electronic program table data produced by the receiver apparatus 15 and a transmission method of information of the parallax/depth are defined. There can be listed up, for example, a method of displaying them as they are, on the receiver apparatus 16, while transmitting both the video for the right eye and the video for the left eye, or a method, in which the receiver apparatus 16 produces the 3D electronic program table in a predetermined order or sequence from those information, while transmitting the video data and the depth information.

The reference numeral 16 depicts the receiver apparatus having an external input terminal, being able to input data from the receiver apparatus, and further enabling the 3D display. It outputs the 3D display data to the display panel 5. in case where the receiver apparatus 16 includes the display panel therein, then connection to the display panel 5 is unnecessary.

Figure 16:
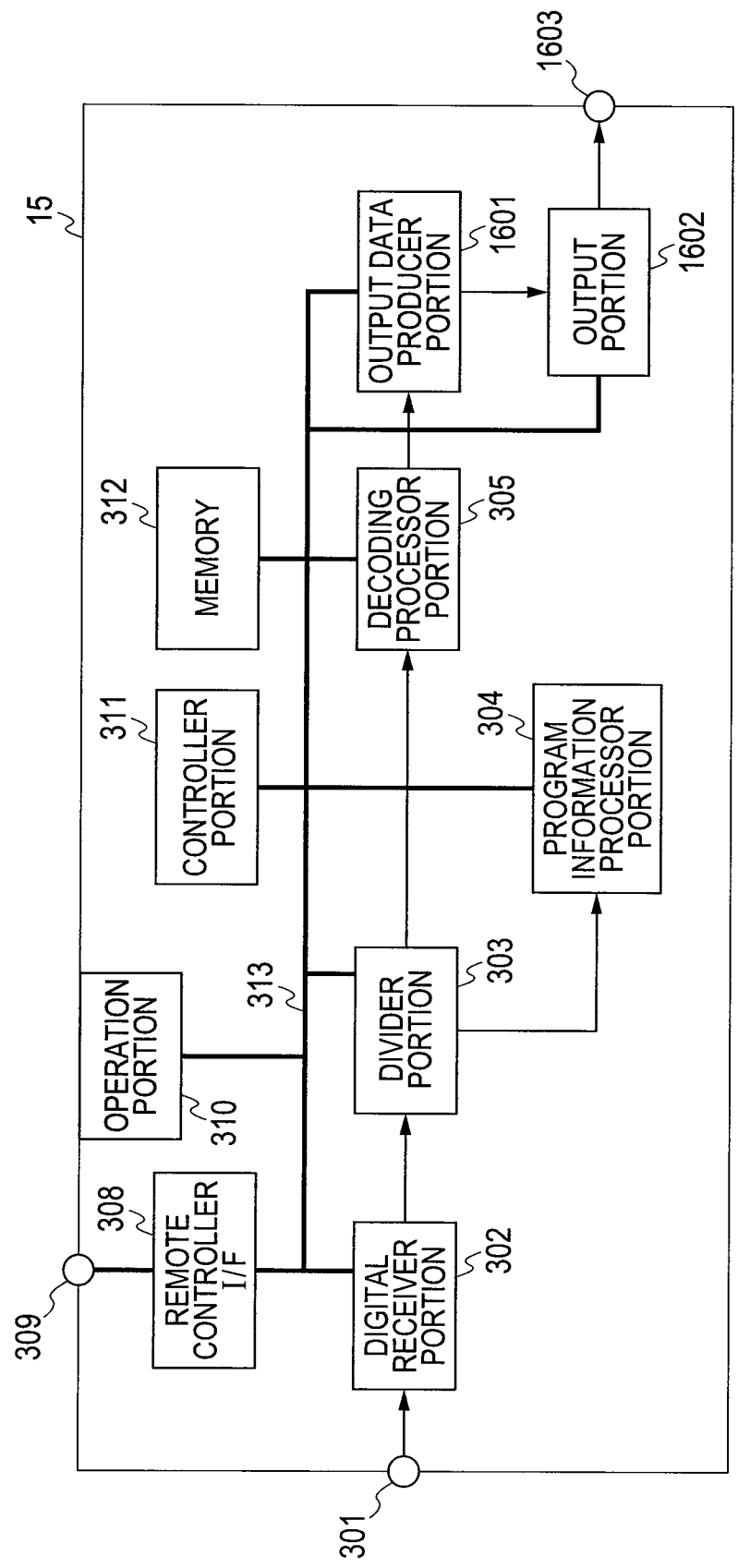
FIG. 16 is a block diagram for showing an example of a receiver apparatus.

FIG. 16 shows an inner structure of the receiver apparatus 15. There is no change in the process of decoding the video/audio data or the process of producing the electronic program table data, to those in the receiver apparatus 4. A reference numeral 1501 depicts an output data producer portion for producing an output screen of the video data, being similar to the display controller portion 306. A reference numeral 1502 depicts an output portion for producing predetermined data for use of transmission, and for providing an output with superimposing the electronic program table data thereon.

Within the present structure, it is also possible to apply the embodiment mentioned above, as it is, and also in case where the receiver apparatus itself is not connected with the display apparatus, directly, it is possible for the user to view the electronic program table being displayed in 3D; thereby, it is possible to utilize the electronic program table being superior in the usability thereof (i.e., the user-friendliness). Thus, she/he can execute the search of 3D programs to view, easily, and in case where the receiver apparatus 15 has further a recording function, then she/he can execute setup of reservation for recording, easily.

Embodiment 2

In the present embodiment, explanation will be made on an embodiment for enabling to increase the usability thereof, with applying the 3D display, other than the electronic program display.

FIG. 17 shows an example of a graphic for displaying a result of the program search. A reference numeral 51 depicts a display screen. In 1701 are aligned tabs for displaying the search classified by a program genre or category. If the user selects a genre or category she/he wishes to see, for example, by means of the left/right keys of the remote controller, then a list of the search result is displayed below that. An order of display is such that, for example, aligning in accordance with a time sequence nearer to the search time. With the search result that cannot be displayed on one (1) screen, it is made visible or readable with exchanging a page through an operation made by the user. As is shown in FIG. 17, a bar may be provided or displayed on a side of the search result, which moves every time when the page is exchanged, so as to show that there are plural numbers of pages to the user; being preferable in the usability for the user. The information of those program titles and the broadcast times is included within the broadcast data received, similar to those of the embodiment in relation with the electronic program table, as the information up to a predetermined future, such as, one (1) week, etc., for example. FIG. 17 shows an example of displaying the search result of a movie program, among the programs displayed in a list, when the cursor is located on "a movie". Among the programs displayed on the list, if there is a 3D broadcast program, then a column displaying that program therein is so displayed that it can be seen jumping or projecting ahead. As a variation, the receiver apparatus determines a recommended program from the information of the user's taste or the like, and displays that recommended program within the programs displayed in the list, for example, in such a manner that it can be seen jumping or projecting out therefrom.

With this control, it is possible for the user to select the 3D broadcast program or the recommended program, intuitionally, and thereby enabling to increase the usability thereof.

Next, explanation will be given on an example of displaying a list in 3D, of the function menu of the receiver apparatus, during the time when displaying the 3D broadcast program thereon, by referring to FIG. 18. A reference numeral 1801 depicts a display column of the function menu, and if the user selects one (1) item among from those, for example, it may be switched to a further detailed setup menu to be displayed, or it may be displayed with enlarging the region of the display menu.

At present, yes/no of the 3D display is determined by the information within the digital information to be transmitted. And, further the fact that viewing is made on the 3D display can be determined by recognition of the operating condition of the output controller portion 311, for example, within the controller portion 310. In case where the user views the 3D display, the controller 310 produces the video for the right eye and the video for the left eye, with providing the parallax on menu data, for example, when display a menu through a predetermined operation, such as, pushing down a button, which is provided on the remote controller for executing the menu display, etc. Those are displayed alternately by the display controller portion 311, so that the menu screen can be seen jumping or projecting ahead.

By taking the volume of jumping or projecting out of the picture displayed on the background into the consideration, the parallax is so provided that it is displayed, necessarily jumping or projecting ahead than that. With this method, it is possible to achieve an OSD display without generating the sense of incompatibility for the user.

Figure 18:
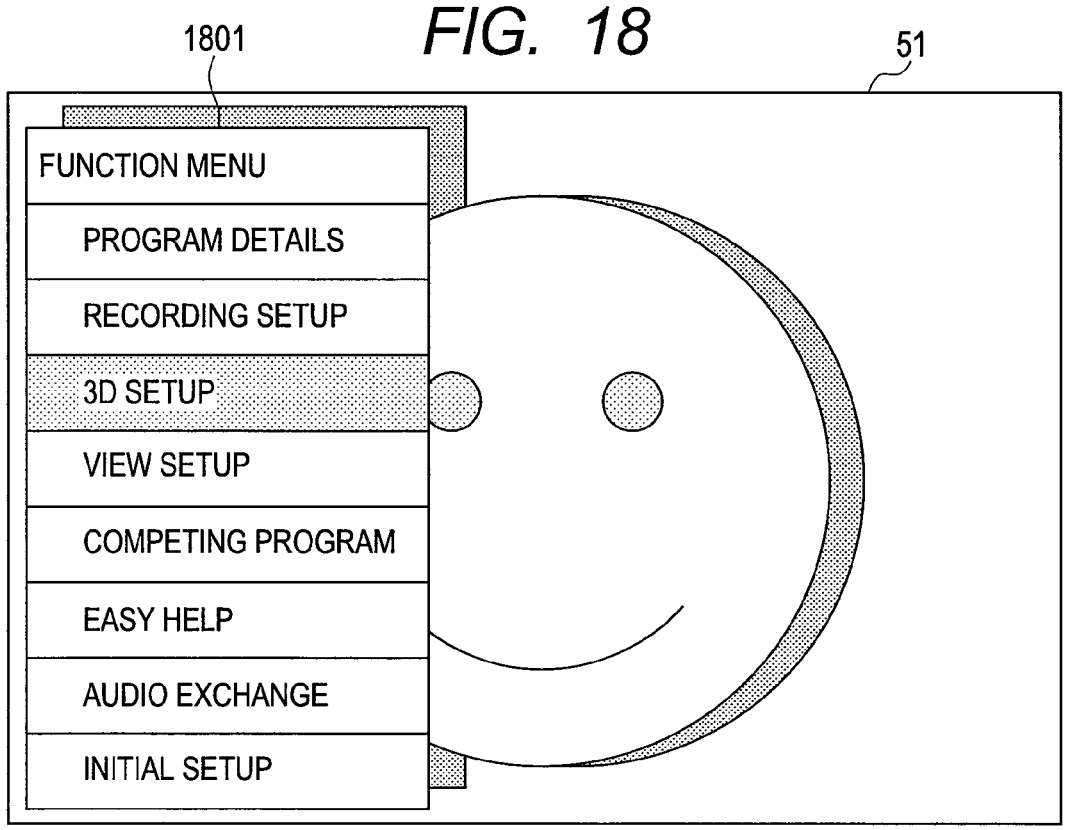
FIG. 18 is an illustrative view for showing an example of a setup menu display.

In the present embodiment, although the menu is displayed on the left side portion of the screen, but the display position may be any place, and with the structure of the function menu, it is not necessary to be that as shown in FIG. 18. Further, for example, displaying only the item, on which the cursor selected by the user lies, to be seen jumping or projecting ahead, etc., it is possible to obtain a menu display with providing further parallax for each item, thereby being easily operable by the user.

Figure 19:
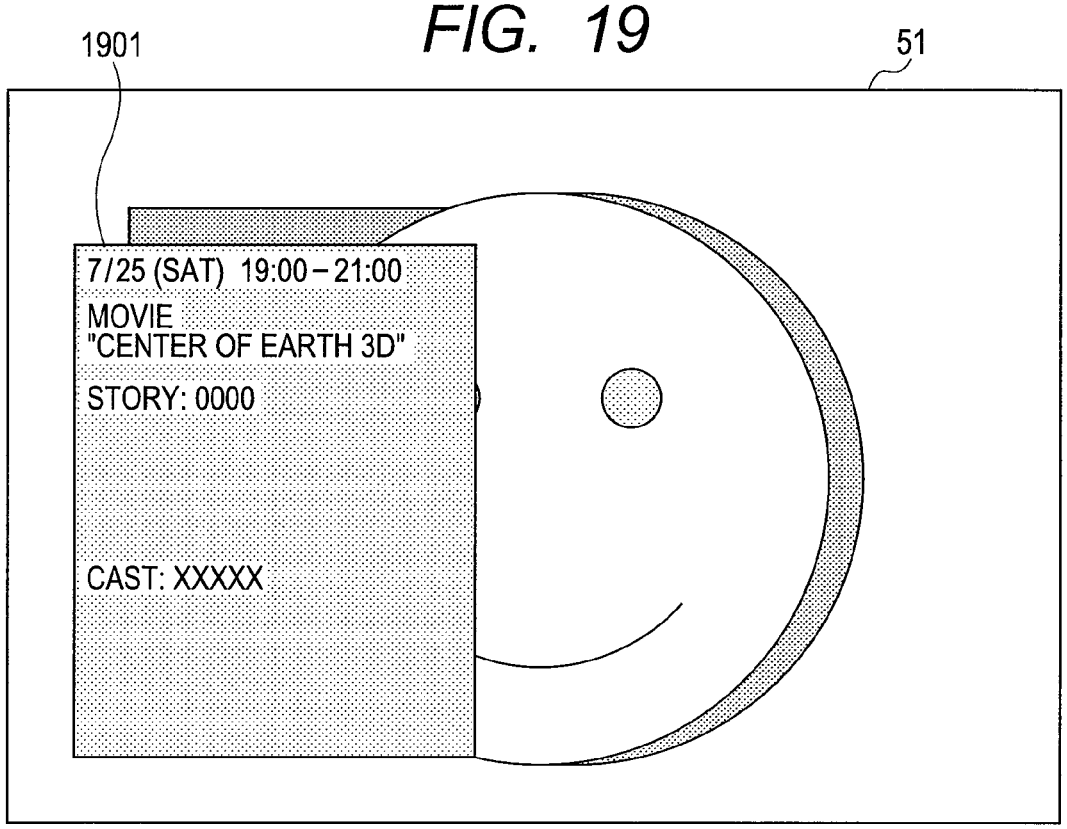
FIG. 19 is an illustrative view for showing an example of a display of explaining details of the program.

Next, explanation will be given on an example of the screen display for confirming the details of the programs under viewing when the user views the 3D broadcast, by referring to FIG. 19. A reference numeral 1901 depicts an example for displaying the detailed information of the programs. As a method for the user to display this information, there may be provided a selection for displaying the detailed information of the program, as one of the function menu, which is shown in the previous embodiment.

Or, there may be a button for displaying the detailed information on the remote controller. In this instance, thus when displaying this detailed information during the time when the user is making a view on 3D display, the controller portion 311 produces the video for the right eye and the video for the left eye with providing the parallax information from the video data for use of display. By displaying this, alternately, by means of the display controller portion 311, a screen of the detailed information of the programs can be displayed to be seen jumping or projecting ahead. In this instance, by taking the volume of jumping or projecting out of the picture displayed on the background into the consideration, the parallax is so provided that it is displayed, necessarily jumping or projecting ahead than that.

With this method, it is possible to achieve the OSD display without generating the sense of incompatibility for the user. The position for displaying a screen of detailed explanation should not be limited to the position as shown in FIG. 19, but may be any place.

Next, explanation will be made on an example of the receiver apparatus having a function of recording the digital data received on a built-in recording medium or reproducing the digital data recorded, by referring to FIG. 20. A reference numeral 2001 depicts a recording/reproducing controller portion for controlling recording and/or reproducing. A reference numeral 2002 depicts a recording medium for recording the digital data thereon. Into the recording/reproducing controller portion 2001 is inputted the digital data, including the video/audio data and the information indicative of whether the program recorded is the 3D broadcast program or not, etc, which are outputted from the divider portion, for example, and there are executed the followings; i.e., a recording control, for executing processes, such as, executing a coding, which is appropriate for recording, or producing index information for identifying a reproducing position when reproducing, and a reproducing control, for reading out the digital data to be reproduced from the recording medium 2002 by referring to the index information mentioned above and transmitting it to the decoding processor portion so that the decoding process will not fail. Of course, the recording and the reproducing may be executed, at the same time.

In case of having the recording/reproducing function mentioned above, there is necessity of an interface, for the user to select a program to be reproduced, from among the programs recorded. The display data is produced within the controller portion 311, and it is displayed through the display controller portion 306. At this time, it can be considered that it is displayed in 3D format by producing the depth information, partially, in the similar manner to that of the embodiments mentioned heretofore.

In FIGS. 21A and 21B is shown an example of displaying a list of programs recorded in 3D. In FIG. 21A, a reference numeral 2101 depicts a tab for selecting the recording medium. In 2102 is shown an example for displaying a group of folders, for the user to rearrange the programs recorded on the recording medium. In 2103 is shown an example of displaying a list of programs, which are managed within the folder selected by 2102. A thumbnail picture of may be each program displayed. In this instance, it is possible to determine on whether the each program is broadcasted in 3D or not, if the program information of the each program is also recorded on the recording medium. With displaying the 3D broadcast program to be seen jumping or projecting out, for the user, it is possible to recognize the 3D broadcast program, easily, and thereby increasing the usability thereof. In the example shown in FIG. 21A, although the video data of the thumbnail portion is displayed in 2D, but this portion may be displayed in 3D.

In the example shown in FIG. 21B, there is shown an example of displaying the programs as a list of the list format. Also in the present example, determination is made on whether the program is the 3D broadcast program or not, for each program recorded, in the similar manner to that shown in FIG. 21A, and display is made so that a portion indicating the information of the 3D broadcast program is displayed to be seen jumping or projecting ahead; thereby enabling the user to recognize the 3D broadcast program, easily.

A function may be provided on a color button, for example, for switching between the displaying methods shown in FIGS. 21A and 21B. In FIGS. 21A and 21B, there is shown the example of enabling that switching when the user pushes down a blue button. Or, the function may be provided on a color button, for switching between the display in the 3D form and the display in the 2D form. In FIGS. 21A and 21B is shown the example of enabling the switching when the user pushes down a red button.

As a variation of the present embodiment, it may be a reproducing apparatus without the receiver portion, or the recording medium may be a portable-type recording medium, which is not built within the receiver apparatus, or plural numbers of the recording media are connected with. For example, even with a detachable recording medium, such as, a Blu-ray Disk, for example, the same process is applicable, if it is the digital data composed of the program information data, including the video/audio and the information indicative of whether the contents recorded are the 3D broadcast programs or not, about the programs recorded within a Disk, and there can be also expected the similar effect thereof. In case where it has plural numbers of recording media, it is possible to display a recording medium of a target to be selectable by the tab shown by 2101, for example; therefore, the user can designate an arbitrary recording data.

Also, with providing a classification "3D", for example, within the folder structure shown by 2102, the controller 311 may distribute the recorded programs, which are determined to the 3D broadcasts from the program information received, automatically. Thus, when the user selects "3D" folder, within the display region is displayed a list produced, which is made of only the 3D broadcast programs therein.

Further, not restricting to the present embodiment, but also with the embodiments of the graphic display, which are shown hereto fore, the similar process is applicable even when reproducing from the recoding medium. For example, with the display of the function menu, it is possible to display the function menu to be seen jumping or projecting out when the user selects the 3D video to be reproduced, from the list of the recorded programs mentioned above.

With the embodiment mentioned above, for the user to use the receiver apparatus (or the reproducing apparatus), being preferable in the usability thereof when reproducing from the recording medium.

Next, explanation will be given on the case where the broadcast programs and the contents recorded on the recording medium include the video for use of the 3D display and the video/audio data for use of the 2D display, independently or separately. For example, it can record a large amount of the digital data thereon, such as, the Blue-ray Disk, for example, both the data, being same in the contents but different in the display method thereof, such as, 3D and 2D, for example, can be on one (1) piece of the recording medium. In case where the receiver apparatus (or, the reproducing apparatus) is compatible with the 3D display, it is possible to reproduce the 3D video. Selection of reproduction, i.e., either 2D or 3D should be reproduced, may be made by the user, through the IF. In this case, the controller portion 311 can display the graphic in 3D, with applying each of the embodiments mentioned above, during when displaying the 3D video, or display the graphic in 2D, during when displaying the 2D video, by determining on which video is in the reproducing operation thereof. As a method for determining, for example, it can be considered to make the determination by observing the operating condition of the display controller portion 306. Or, it may be made by referring to the information, i.e., the user selects to reproduce which one of 2D/3D, as was mentioned previously.

From the above-mentioned, the user can see the graphic, fitting to the condition of the video that she/he is viewing, and obtain the display without generating the sense of incompatibility.

However, the embodiments mentioned above can be combined with, appropriately. For example, the display of EPG shown in the embodiment 1 and the graphic display other than EPG shown in the embodiment 2 can be combined with each other.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A receiver apparatus, comprising:
    a receiver portion configured to receive digital information;
    a divider portion configured to divide the received digital information into video data/audio data and program information data;
    a decoder configured to decode the video data/audio data, which is divided in said divider portion, for viewing/listening the video data/audio data; and
    a display controller portion configured to produce program information display data for use of a display based on said program information data divided, and configured to conduct a display control for displaying the program information display data produced piling on a decoded video by said decoder, wherein:
    said display controller portion is configured to conduct a display control for displaying all or a part of the program information display data in 3D when said decoded video is displayed in 3D, and
    the display controller portion is configured control the program information display data, which is displayed in 3D in front of the decoded video, when the said decoded video is displayed in 3D.

2. The receiver apparatus, as is described in claim 1, wherein the data production by said display controller portion includes a process for giving parallaxes to video for left eye and video for right eye.

3. The receiver apparatus, as is described in claim 1, wherein said display controller portion identifies a program of a cubic broadcast with said program information data received, and determines a portion to be displayed in a cubic manner within a portion for displaying the program information display data based on a result of the identification.

4. The receiver apparatus, as is described in claim 1, wherein said display controller portion identifies predetermined taste information of a user, and determines a portion to be displayed in a cubic manner, when producing the program information display data, based on said program information data and said predetermined taste information of the user.

5. The receiver apparatus, as is described in claim 1, further comprising:
   a video controller portion configured to produce a cubic video through decoding said video data, wherein:
   said display controller portion judges whether said video controller portion is outputting the video in a cubic manner or not, and
   said display controller portion determines, based on a result of the judgment, whether said program information display data are to be displayed in a cubic manner or not.

6. The receiver apparatus, as is described in claim 1, wherein said display controller portion identifies a program of a cubic broadcast with said program information data received, and produces, when producing said program information display data, particular program information display data having a line for displaying therein only program information of the identified program of the cubic broadcast.

7. The receiver apparatus, as is described in claim 2, wherein said display controller portion changes the volume of jumping or projecting of the program information display data when changing the number of programs in the program information display data.

8. The receiver apparatus, as is described in claim 2, wherein parallax volumes of all or a part of plural portions in the program information display data are different when producing the program information display data displaying the plural portions in a cubic manner.

9. The receiver apparatus, as is described in claim 2, wherein parallax volumes of all or a part of plural portions in the program information display data are different when producing the program information display data displaying the plural portions in a cubic manner.

10. The receiver apparatus, as is described in claim 3, wherein parallax volumes of all or a part of plural portions in the program information display data are different when producing the program information display data displaying the plural portions in a cubic manner.

11. The receiver apparatus, as is described in claim 4, wherein parallax volumes of all or a part of plural portions in the program information display data are different when producing the program information display data displaying the plural portions in a cubic manner.

12. The receiver apparatus, as is described in claim 5, wherein parallax volumes of all or a part of plural portions in the program information display data are different when producing the program information display data displaying the plural portions in a cubic manner.

13. The receiver apparatus, as is described in claim 6, wherein parallax volumes of all or a part of plural portions in the program information display data are different when producing the program information display data displaying the plural portions in a cubic manner.

14. The receiver apparatus, as is described in claim 7, wherein parallax volumes of all or a part of plural portions in the program information display data are different when producing the program information display data displaying the plural portions in a cubic manner.

* * * * *